(12) United States Patent
Basallo et al.

(10) Patent No.: US 9,466,169 B2
(45) Date of Patent: *Oct. 11, 2016

(54) GAMING SYSTEM AND METHOD FOR PROVIDING A GAME INCLUDING ROAMING WILD SYMBOLS

(71) Applicant: IGT, Las Vegas, NV (US)

(72) Inventors: Leandro Basallo, San Francisco, CA (US); Prashant Arora, Mountain View, CA (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/809,977

(22) Filed: Jul. 27, 2015

(65) Prior Publication Data
US 2015/0332546 A1    Nov. 19, 2015

Related U.S. Application Data

(63) Continuation of application No. 13/790,759, filed on Mar. 8, 2013, now Pat. No. 9,098,847.

(51) Int. Cl.
| | |
|---|---|
| *G07F 17/32* | (2006.01) |
| *G07F 17/34* | (2006.01) |
| *G06Q 20/32* | (2012.01) |

(52) U.S. Cl.
CPC ........ *G07F 17/3213* (2013.01); *G06Q 20/3255* (2013.01); *G07F 17/3225* (2013.01); *G07F 17/3239* (2013.01); *G07F 17/3246* (2013.01); *G07F 17/3248* (2013.01); *G07F 17/3255* (2013.01); *G07F 17/3267* (2013.01); *G07F 17/34* (2013.01); *G07F 17/3211* (2013.01)

(58) Field of Classification Search
CPC ... G07F 17/32; G07F 17/3211; G07F 17/326
USPC .................................................. 463/16–20
See application file for complete search history.

(56) References Cited

U.S. PATENT DOCUMENTS

| | | |
|---|---|---|
| 1,978,395 A | 10/1934 | Groetchen |
| 2,545,644 A | 3/1951 | Benton et al. |
| 2,692,074 A | 10/1954 | Mueller et al. |
| 3,420,525 A | 1/1969 | Waders |
| 3,642,287 A | 2/1972 | Lally et al. |
| 3,667,757 A | 6/1972 | Holmberg |
| 3,735,987 A | 5/1973 | Ohki |
| 3,889,444 A | 6/1975 | Davis et al. |
| 4,198,052 A | 4/1980 | Gauselmann |
| 4,258,838 A | 3/1981 | Rockola et al. |
| 4,410,178 A | 10/1983 | Partridge |
| 4,448,419 A | 5/1984 | Telnaes |
| 4,467,424 A | 8/1984 | Hedges et al. |
| 4,513,970 A | 4/1985 | Opresco et al. |
| 4,560,161 A | 12/1985 | Hamano |

(Continued)

FOREIGN PATENT DOCUMENTS

| | | |
|---|---|---|
| AU | 199716432 | 9/1997 |
| AU | 199717601 | 9/1997 |

(Continued)

*Primary Examiner* — Michael Cuff
(74) *Attorney, Agent, or Firm* — Neal, Gerber & Eisenberg LLP

(57) ABSTRACT

In various embodiments, the present disclosure relates generally to gaming systems and methods for providing one or more games employing roaming wild symbols.

22 Claims, 18 Drawing Sheets

(56) References Cited

U.S. PATENT DOCUMENTS

| | | |
|---|---|---|
| 4,582,324 A | 4/1986 | Koza et al. |
| 4,586,713 A | 5/1986 | Abu-Shumays et al. |
| 4,618,150 A | 10/1986 | Kimura |
| 4,621,814 A | 11/1986 | Stepan et al. |
| 4,624,459 A | 11/1986 | Kaufman |
| 4,648,600 A | 3/1987 | Olliges |
| 4,669,730 A | 6/1987 | Small |
| 4,679,143 A | 7/1987 | Hagiwara |
| 4,695,053 A | 9/1987 | Vazquez, Jr. et al. |
| 4,706,956 A | 11/1987 | Abu-Shumays et al. |
| 4,722,527 A | 2/1988 | Gauselmann |
| 4,743,002 A | 5/1988 | Menzel |
| 4,743,022 A | 5/1988 | Wood |
| 4,756,531 A | 7/1988 | DiRe et al. |
| 4,805,907 A | 2/1989 | Haiwara |
| 4,817,952 A | 4/1989 | Biro et al. |
| 4,823,538 A | 4/1989 | Takamura |
| 4,836,546 A | 6/1989 | DiRe et al. |
| 4,836,553 A | 6/1989 | Suttle et al. |
| 4,838,552 A | 6/1989 | Hagiwara |
| 4,844,467 A | 7/1989 | Gyenge et al. |
| 4,856,787 A | 8/1989 | Itkis |
| 4,861,041 A | 8/1989 | Jones et al. |
| 4,871,171 A | 10/1989 | Rivero |
| 4,874,173 A | 10/1989 | Kishishita |
| 4,889,340 A | 12/1989 | Greene |
| 4,922,522 A | 5/1990 | Scanlon |
| 4,926,327 A | 5/1990 | Sidley |
| 4,991,848 A | 2/1991 | Greenwood et al. |
| 5,019,973 A | 5/1991 | Wilcox et al. |
| 5,033,744 A | 7/1991 | Bridgeman et al. |
| 5,042,818 A | 8/1991 | Weingardt |
| 5,067,712 A | 11/1991 | Georgilas |
| 5,078,405 A | 1/1992 | Jones et al. |
| 5,085,435 A | 2/1992 | Rossides |
| 5,085,436 A | 2/1992 | Bennett |
| 5,092,598 A | 3/1992 | Kamille |
| 5,098,107 A | 3/1992 | Boylan et al. |
| 5,102,134 A | 4/1992 | Smyth |
| 5,102,137 A | 4/1992 | Ekiert |
| 5,116,055 A | 5/1992 | Tracy |
| 5,152,529 A | 10/1992 | Okada |
| 5,154,429 A | 10/1992 | LeVasseur |
| 5,159,549 A | 10/1992 | Hallman, Jr. et al. |
| 5,167,413 A | 12/1992 | Fulton |
| 5,178,390 A | 1/1993 | Okada |
| 5,179,517 A | 1/1993 | Sarbin et al. |
| 5,205,555 A | 4/1993 | Hamano |
| 5,209,476 A | 5/1993 | Elba |
| 5,209,479 A | 5/1993 | Nagao et al. |
| 5,211,399 A | 5/1993 | Howard |
| 5,224,706 A | 7/1993 | Bridgeman et al. |
| 5,248,142 A | 9/1993 | Breeding |
| 5,249,800 A | 10/1993 | Hilgendorf et al. |
| 5,257,784 A | 11/1993 | Boylan et al. |
| 5,259,613 A | 11/1993 | Marnell, II |
| 5,259,616 A | 11/1993 | Bergmann |
| 5,275,400 A | 1/1994 | Weingardt et al. |
| 5,277,424 A | 1/1994 | Wilms |
| 5,282,633 A | 2/1994 | Boylan et al. |
| 5,288,077 A | 2/1994 | Jones |
| 5,288,081 A | 2/1994 | Breeding |
| 5,308,065 A | 5/1994 | Bridgeman et al. |
| 5,324,035 A | 6/1994 | Morris et al. |
| 5,332,219 A | 7/1994 | Marnell, II et al. |
| 5,332,228 A | 7/1994 | Schultz |
| 5,342,047 A | 8/1994 | Heidel et al. |
| 5,342,049 A | 8/1994 | Wichinsky et al. |
| 5,344,144 A | 9/1994 | Canon |
| 5,362,052 A | 11/1994 | Kubatsch |
| 5,364,100 A | 11/1994 | Ludlow et al. |
| 5,364,105 A | 11/1994 | Jones |
| 5,370,399 A | 12/1994 | Liverance |
| 5,371,345 A | 12/1994 | LeStrange et al. |
| 5,373,440 A | 12/1994 | Cohen et al. |
| 5,377,973 A | 1/1995 | Jones et al. |
| 5,390,934 A | 2/1995 | Grassa |
| 5,393,057 A | 2/1995 | Marnell, II |
| 5,393,061 A | 2/1995 | Manship et al. |
| 5,393,067 A | 2/1995 | Paulsen et al. |
| 5,395,111 A | 3/1995 | Inoue |
| 5,395,242 A | 3/1995 | Slye et al. |
| 5,397,128 A | 3/1995 | Hesse et al. |
| 5,407,200 A | 4/1995 | Zalabak |
| 5,411,258 A | 5/1995 | Wilson et al. |
| 5,415,416 A | 5/1995 | Scagnelli et al. |
| 5,423,539 A | 6/1995 | Nagao |
| 5,429,507 A | 7/1995 | Kaplan |
| 5,431,407 A | 7/1995 | Hofberg et al. |
| 5,431,408 A | 7/1995 | Adams |
| 5,437,462 A | 8/1995 | Breeding |
| 5,449,173 A | 9/1995 | Thomas et al. |
| 5,450,938 A | 9/1995 | Rademacher |
| 5,452,899 A | 9/1995 | Skratulia et al. |
| 5,456,465 A | 10/1995 | Durham |
| 5,470,079 A | 11/1995 | LeStrange et al. |
| 5,472,194 A | 12/1995 | Breeding et al. |
| 5,489,101 A | 2/1996 | Moody |
| 5,490,670 A | 2/1996 | Hobert |
| 5,494,287 A | 2/1996 | Manz |
| 5,511,781 A | 4/1996 | Wood et al. |
| 5,524,888 A | 6/1996 | Heidel |
| 5,529,309 A | 6/1996 | Bartlett |
| 5,531,440 A | 7/1996 | Dabrowski et al. |
| 5,531,441 A | 7/1996 | Dabrowski et al. |
| 5,536,016 A | 7/1996 | Thompson |
| 5,542,669 A | 8/1996 | Charron et al. |
| 5,544,892 A | 8/1996 | Breeding |
| 5,560,603 A | 10/1996 | Seelig et al. |
| 5,564,700 A | 10/1996 | Celona |
| 5,569,084 A | 10/1996 | Nicastro et al. |
| 5,570,885 A | 11/1996 | Ornstein |
| 5,577,731 A | 11/1996 | Jones |
| 5,580,309 A | 12/1996 | Piechowiak et al. |
| 5,580,311 A | 12/1996 | Haste, III |
| 5,584,485 A | 12/1996 | Jones et al. |
| 5,584,764 A | 12/1996 | Inoue |
| 5,593,349 A | 1/1997 | Miguel et al. |
| 5,607,162 A | 3/1997 | Boylan et al. |
| 5,609,524 A | 3/1997 | Inoue |
| 5,611,535 A | 3/1997 | Tiberio |
| 5,611,730 A | 3/1997 | Weiss |
| 5,620,182 A | 4/1997 | Rossides |
| 5,626,341 A | 5/1997 | Jones et al. |
| 5,639,088 A | 6/1997 | Schneider et al. |
| 5,642,882 A | 7/1997 | Guerzini |
| 5,642,884 A | 7/1997 | Pitcher |
| 5,647,798 A | 7/1997 | Falciglia |
| 5,655,961 A | 8/1997 | Acres et al. |
| 5,655,965 A | 8/1997 | Takemoto et al. |
| 5,660,391 A | 8/1997 | Klasee |
| 5,660,393 A | 8/1997 | Dreger |
| 5,664,781 A | 9/1997 | Feola |
| 5,673,917 A | 10/1997 | Vancura |
| 5,674,128 A | 10/1997 | Holch et al. |
| 5,697,843 A | 12/1997 | Manship et al. |
| 5,704,835 A | 1/1998 | Dietz, II |
| 5,707,286 A | 1/1998 | Carlson |
| 5,711,525 A | 1/1998 | Breeding |
| 5,720,662 A | 2/1998 | Holmes, Jr. et al. |
| D392,340 S | 3/1998 | DeSimone |
| 5,722,891 A | 3/1998 | Inoue |
| 5,732,948 A | 3/1998 | Yoseloff |
| 5,743,524 A | 4/1998 | Nannicola |
| 5,749,784 A | 5/1998 | Clapper, Jr. |
| 5,752,881 A | 5/1998 | Inoue |
| 5,759,103 A | 6/1998 | Freels et al. |
| 5,761,647 A | 6/1998 | Boushy |
| 5,762,552 A | 6/1998 | Vuong et al. |
| 5,766,074 A | 6/1998 | Cannon et al. |
| 5,769,716 A | 6/1998 | Saffari et al. |
| 5,770,533 A | 6/1998 | Franchi |
| 5,772,506 A | 6/1998 | Marks et al. |
| 5,772,509 A | 6/1998 | Weiss |

(56) References Cited

U.S. PATENT DOCUMENTS

| | | |
|---|---|---|
| 5,775,692 A | 7/1998 | Watts et al. |
| 5,788,573 A | 8/1998 | Baerlocher et al. |
| 5,788,574 A | 8/1998 | Ornstein et al. |
| 5,794,964 A | 8/1998 | Jones et al. |
| 5,795,225 A | 8/1998 | Jones et al. |
| 5,807,172 A | 9/1998 | Piechowiak |
| 5,810,361 A | 9/1998 | Kadlic |
| 5,816,915 A | 10/1998 | Kadlic |
| 5,816,918 A | 10/1998 | Kelly et al. |
| 5,823,534 A | 10/1998 | Banyai |
| 5,823,873 A | 10/1998 | Moody |
| 5,823,874 A | 10/1998 | Adams |
| 5,833,536 A | 11/1998 | Davids et al. |
| 5,833,537 A | 11/1998 | Barrie |
| 5,839,730 A | 11/1998 | Pike |
| 5,848,932 A | 12/1998 | Adams |
| 5,851,148 A | 12/1998 | Brune et al. |
| 5,855,514 A | 1/1999 | Kamille |
| 5,863,041 A | 1/1999 | Boylan et al. |
| 5,868,618 A | 2/1999 | Netley et al. |
| 5,868,619 A | 2/1999 | Wood et al. |
| 5,873,781 A | 2/1999 | Keane |
| 5,882,259 A | 3/1999 | Holmes, Jr. et al. |
| 5,882,261 A | 3/1999 | Adams |
| 5,885,157 A | 3/1999 | Harada et al. |
| 5,890,962 A | 4/1999 | Takemoto |
| 5,911,418 A | 6/1999 | Adams |
| 5,918,880 A | 7/1999 | Voigt, IV et al. |
| 5,919,088 A | 7/1999 | Weiss |
| 5,927,714 A | 7/1999 | Kaplan |
| 5,934,672 A | 8/1999 | Sines et al. |
| 5,935,002 A | 8/1999 | Falciglia |
| 5,944,315 A | 8/1999 | Mostashari |
| 5,947,820 A | 9/1999 | Morro et al. |
| 5,947,821 A | 9/1999 | Stone |
| 5,951,397 A | 9/1999 | Dickinson |
| 5,953,127 A | 9/1999 | Washio et al. |
| 5,964,463 A | 10/1999 | Moore, Jr. |
| 5,967,894 A | 10/1999 | Kinoshita et al. |
| 5,967,896 A | 10/1999 | Jorasch et al. |
| 5,971,849 A | 10/1999 | Falciglia |
| 5,980,384 A | 11/1999 | Barrie |
| 5,984,779 A | 11/1999 | Bridgeman et al. |
| 5,984,781 A | 11/1999 | Sunaga |
| 5,984,782 A | 11/1999 | Inoue |
| 5,988,638 A | 11/1999 | Rodesch et al. |
| 5,996,997 A | 12/1999 | Kamille |
| 5,997,400 A | 12/1999 | Seelig et al. |
| 5,997,401 A | 12/1999 | Crawford |
| 6,001,016 A | 12/1999 | Walker et al. |
| 6,003,867 A | 12/1999 | Rodesch et al. |
| 6,004,207 A | 12/1999 | Wilson, Jr. et al. |
| 6,007,066 A | 12/1999 | Moody |
| 6,012,982 A | 1/2000 | Piechowiak et al. |
| 6,015,344 A | 1/2000 | Kelly et al. |
| 6,015,346 A | 1/2000 | Bennett |
| 6,019,369 A | 2/2000 | Nakagawa et al. |
| 6,019,374 A | 2/2000 | Breeding |
| 6,024,642 A | 2/2000 | Stupak |
| 6,033,307 A | 3/2000 | Vancura |
| 6,039,648 A | 3/2000 | Guinn et al. |
| 6,056,289 A | 5/2000 | Clapper, Jr. |
| 6,056,641 A | 5/2000 | Webb |
| 6,056,642 A | 5/2000 | Bennett |
| 6,059,289 A | 5/2000 | Vancura |
| 6,059,658 A | 5/2000 | Mangano et al. |
| 6,062,978 A | 5/2000 | Martino et al. |
| 6,062,980 A | 5/2000 | Luciano |
| 6,068,552 A | 5/2000 | Walker et al. |
| 6,077,162 A | 6/2000 | Weiss |
| 6,086,066 A | 7/2000 | Takeuchi et al. |
| 6,089,976 A | 7/2000 | Schneider et al. |
| 6,089,977 A | 7/2000 | Bennett |
| 6,089,978 A | 7/2000 | Adams |
| 6,093,102 A | 7/2000 | Bennett |
| 6,095,921 A | 8/2000 | Walker et al. |
| 6,102,400 A | 8/2000 | Scott et al. |
| 6,102,798 A | 8/2000 | Bennett |
| 6,117,009 A | 9/2000 | Yoseloff |
| 6,120,031 A | 9/2000 | Adams |
| 6,120,377 A | 9/2000 | McGinnis, Sr. et al. |
| 6,120,378 A | 9/2000 | Moody et al. |
| 6,126,541 A | 10/2000 | Fuchs |
| 6,126,542 A | 10/2000 | Fier |
| 6,135,885 A | 10/2000 | Lermusiaux |
| 6,142,872 A | 11/2000 | Walker et al. |
| 6,142,873 A | 11/2000 | Weiss et al. |
| 6,142,874 A | 11/2000 | Kodachi et al. |
| 6,142,875 A | 11/2000 | Kodachi et al. |
| 6,146,273 A | 11/2000 | Olsen |
| 6,149,156 A | 11/2000 | Feola |
| 6,149,521 A | 11/2000 | Sanduski |
| 6,149,522 A | 11/2000 | Alcorn et al. |
| 6,155,925 A | 12/2000 | Giobbi et al. |
| 6,159,095 A | 12/2000 | Frohm et al. |
| 6,159,096 A | 12/2000 | Yoseloff |
| 6,159,097 A | 12/2000 | Gura |
| 6,159,098 A | 12/2000 | Slomiany et al. |
| 6,162,121 A | 12/2000 | Morro et al. |
| 6,165,070 A | 12/2000 | Nolte et al. |
| 6,168,520 B1 | 1/2001 | Baerlocher et al. |
| 6,168,523 B1 | 1/2001 | Piechowiak et al. |
| 6,173,955 B1 | 1/2001 | Perrie et al. |
| 6,174,233 B1 | 1/2001 | Sunaga et al. |
| 6,174,235 B1 | 1/2001 | Walker et al. |
| 6,179,711 B1 | 1/2001 | Yoseloff |
| 6,186,894 B1 | 2/2001 | Mayeroff |
| 6,190,254 B1 | 2/2001 | Bennett |
| 6,190,255 B1 | 2/2001 | Thomas et al. |
| 6,200,217 B1 | 3/2001 | Osawa |
| 6,203,409 B1 | 3/2001 | Kennedy et al. |
| 6,203,427 B1 | 3/2001 | Walker et al. |
| 6,203,428 B1 | 3/2001 | Giobbi et al. |
| 6,203,429 B1 | 3/2001 | Demar et al. |
| 6,210,279 B1 | 4/2001 | Dickinson |
| 6,213,875 B1 | 4/2001 | Suzuki |
| 6,213,876 B1 | 4/2001 | Moore, Jr. |
| 6,220,959 B1 | 4/2001 | Holmes, Jr. et al. |
| 6,224,483 B1 | 5/2001 | Mayeroff |
| 6,224,484 B1 | 5/2001 | Okuda et al. |
| 6,227,969 B1 | 5/2001 | Yoseloff |
| 6,227,970 B1 | 5/2001 | Shimizu et al. |
| 6,227,971 B1 | 5/2001 | Weiss |
| 6,231,442 B1 | 5/2001 | Mayeroff |
| 6,231,445 B1 | 5/2001 | Acres |
| 6,234,897 B1 | 5/2001 | Frohm et al. |
| 6,234,900 B1 | 5/2001 | Cumbers |
| 6,238,287 B1 | 5/2001 | Komori et al. |
| 6,238,288 B1 | 5/2001 | Walker et al. |
| 6,241,607 B1 | 6/2001 | Payne et al. |
| 6,251,013 B1 | 6/2001 | Bennett |
| D445,841 S | 7/2001 | Sabo |
| 6,254,481 B1 | 7/2001 | Jaffe et al. |
| 6,261,177 B1 | 7/2001 | Bennett |
| 6,264,561 B1 | 7/2001 | Saffari et al. |
| 6,270,408 B1 | 8/2001 | Sakamoto |
| 6,270,409 B1 | 8/2001 | Shuster |
| 6,270,411 B1 | 8/2001 | Gura et al. |
| 6,270,412 B1 | 8/2001 | Crawford et al. |
| 6,287,194 B1 | 9/2001 | Okada et al. |
| 6,290,600 B1 | 9/2001 | Glasson |
| 6,296,568 B1 | 10/2001 | Tracy |
| 6,299,165 B1 | 10/2001 | Nagano |
| 6,299,170 B1 | 10/2001 | Yoseloff |
| 6,302,398 B1 | 10/2001 | Vecchio |
| 6,302,790 B1 | 10/2001 | Brossard |
| 6,305,686 B1 | 10/2001 | Perrie et al. |
| 6,309,300 B1 | 10/2001 | Glavich |
| 6,311,976 B1 | 11/2001 | Yoseloff et al. |
| 6,312,334 B1 | 11/2001 | Yoseloff |
| 6,315,660 B1 | 11/2001 | DeMar et al. |
| 6,315,663 B1 | 11/2001 | Sakamoto |
| 6,315,664 B1 | 11/2001 | Baerlocher et al. |
| 6,315,666 B1 | 11/2001 | Mastera et al. |

(56) References Cited

U.S. PATENT DOCUMENTS

| | | |
|---|---|---|
| 6,319,124 B1 | 11/2001 | Baerlocher et al. |
| 6,319,125 B1 | 11/2001 | Acres |
| 6,322,078 B1 | 11/2001 | Adams |
| 6,322,309 B1 | 11/2001 | Thomas et al. |
| 6,328,649 B1 | 12/2001 | Randall et al. |
| 6,334,814 B1 | 1/2002 | Adams |
| 6,336,857 B1 | 1/2002 | McBride |
| 6,336,860 B1 | 1/2002 | Webb |
| 6,336,863 B1 | 1/2002 | Baerlocher et al. |
| 6,340,158 B2 | 1/2002 | Pierce et al. |
| 6,346,043 B1 | 2/2002 | Colin et al. |
| 6,347,996 B1 | 2/2002 | Gilmore et al. |
| 6,358,144 B1 | 3/2002 | Kadlic et al. |
| 6,358,147 B1 | 3/2002 | Jaffe et al. |
| 6,361,441 B1 | 3/2002 | Walker et al. |
| 6,364,766 B1 | 4/2002 | Anderson et al. |
| 6,364,768 B1 | 4/2002 | Acres et al. |
| 6,375,187 B1 | 4/2002 | Baerlocher |
| 6,375,570 B1 | 4/2002 | Poole |
| 6,379,248 B1 | 4/2002 | Jorasch et al. |
| 6,394,902 B1 | 5/2002 | Glavich et al. |
| 6,394,907 B1 | 5/2002 | Rowe |
| D458,311 S | 6/2002 | Seelig et al. |
| 6,398,218 B1 | 6/2002 | Vancura |
| 6,398,220 B1 | 6/2002 | Inoue |
| 6,398,644 B1 | 6/2002 | Perrie et al. |
| 6,406,369 B1 | 6/2002 | Baerlocher et al. |
| 6,409,602 B1 | 6/2002 | Wiltshire et al. |
| 6,413,160 B1 | 7/2002 | Vancura |
| 6,413,161 B1 | 7/2002 | Baerlocher et al. |
| 6,413,162 B1 | 7/2002 | Baerlocher et al. |
| 6,416,408 B2 | 7/2002 | Tracy et al. |
| 6,419,579 B1 | 7/2002 | Bennett |
| 6,425,823 B1 | 7/2002 | Byrne |
| 6,425,824 B1 | 7/2002 | Baerlocher et al. |
| 6,428,412 B1 | 8/2002 | Anderson et al. |
| 6,431,548 B1 | 8/2002 | Voigt, IV et al. |
| 6,431,983 B2 | 8/2002 | Acres |
| 6,435,511 B1 | 8/2002 | Vancura et al. |
| 6,439,943 B1 | 8/2002 | Aoki et al. |
| 6,439,993 B1 | 8/2002 | O'Halloran |
| 6,439,995 B1 | 8/2002 | Hughs-Baird et al. |
| D463,504 S | 9/2002 | Stephan |
| 6,443,452 B1 | 9/2002 | Brune |
| 6,443,837 B1 | 9/2002 | Jaffe et al. |
| 6,443,841 B1 | 9/2002 | Rossides |
| 6,454,266 B1 | 9/2002 | Breeding et al. |
| 6,454,651 B1 | 9/2002 | Yoseloff |
| 6,461,241 B1 | 10/2002 | Webb et al. |
| 6,464,582 B1 | 10/2002 | Baerlocher et al. |
| 6,468,156 B1 | 10/2002 | Hughs-Baird et al. |
| 6,471,208 B2 | 10/2002 | Yoseloff et al. |
| 6,481,713 B2 | 11/2002 | Perrie et al. |
| 6,491,584 B2 | 12/2002 | Graham et al. |
| 6,494,454 B2 | 12/2002 | Adams |
| 6,494,785 B1 | 12/2002 | Gerrard et al. |
| 6,506,114 B1 | 1/2003 | Estes et al. |
| 6,506,118 B1 | 1/2003 | Baerlocher et al. |
| 6,511,375 B1 | 1/2003 | Kaminkow |
| 6,514,141 B1 | 2/2003 | Kaminkow et al. |
| 6,517,073 B1 | 2/2003 | Vancura |
| 6,517,432 B1 | 2/2003 | Jaffe |
| 6,517,433 B2 | 2/2003 | Loose et al. |
| 6,523,829 B1 | 2/2003 | Walker et al. |
| 6,537,150 B1 | 3/2003 | Luciano et al. |
| 6,537,152 B2 | 3/2003 | Seelig et al. |
| 6,549,912 B1 | 4/2003 | Chen |
| 6,551,187 B1 | 4/2003 | Jaffe |
| 6,554,703 B1 | 4/2003 | Bussick et al. |
| 6,554,704 B2 | 4/2003 | Nicastro et al. |
| 6,554,709 B1 | 4/2003 | Brenner et al. |
| 6,558,253 B1 | 5/2003 | DeSimone et al. |
| 6,558,254 B2 | 5/2003 | Baelocher et al. |
| 6,561,904 B1 | 5/2003 | Locke et al. |
| 6,565,433 B1 | 5/2003 | Baerlocher et al. |
| 6,565,436 B1 | 5/2003 | Baerlocher |
| 6,569,015 B1 | 5/2003 | Baerlocher et al. |
| 6,569,016 B1 | 5/2003 | Baerlocher |
| 6,572,471 B1 | 6/2003 | Bennett |
| 6,572,473 B1 | 6/2003 | Baerlocher |
| 6,575,830 B2 | 6/2003 | Baerlocher et al. |
| 6,579,179 B2 | 6/2003 | Poole et al. |
| 6,585,591 B1 | 7/2003 | Baerlocher et al. |
| 6,589,114 B2 | 7/2003 | Rose |
| 6,592,457 B1 | 7/2003 | Frohm et al. |
| 6,595,854 B2 | 7/2003 | Hughs-Baird et al. |
| 6,595,855 B2 | 7/2003 | Sako |
| 6,599,185 B1 | 7/2003 | Kaminkow et al. |
| 6,599,192 B1 | 7/2003 | Baerlocher et al. |
| 6,602,137 B2 | 8/2003 | Kaminkow et al. |
| 6,604,740 B1 | 8/2003 | Singer et al. |
| 6,605,002 B2 | 8/2003 | Baerlocher |
| 6,607,195 B2 | 8/2003 | Vancura |
| 6,607,437 B2 | 8/2003 | Casey et al. |
| 6,607,438 B2 | 8/2003 | Baerlocher et al. |
| 6,607,441 B1 | 8/2003 | Acres |
| 6,609,974 B2 | 8/2003 | Mead et al. |
| 6,616,142 B2 | 9/2003 | Adams |
| 6,632,139 B1 | 10/2003 | Baerlocher |
| 6,632,140 B2 | 10/2003 | Berman et al. |
| 6,632,141 B2 | 10/2003 | Webb et al. |
| 6,634,941 B2 | 10/2003 | Olive |
| 6,634,943 B1 | 10/2003 | Baerlocher |
| 6,634,945 B2 | 10/2003 | Glavich et al. |
| 6,638,164 B2 | 10/2003 | Randall et al. |
| 6,644,663 B2 | 11/2003 | Seelig et al. |
| 6,644,664 B2 | 11/2003 | Muir et al. |
| 6,652,378 B2 | 11/2003 | Cannon et al. |
| 6,656,040 B1 | 12/2003 | Brosnan et al. |
| 6,659,864 B2 | 12/2003 | McGahn et al. |
| 6,676,512 B2 | 1/2004 | Fong et al. |
| 6,679,497 B2 | 1/2004 | Walker et al. |
| 6,685,567 B2 | 2/2004 | Cockerille et al. |
| 6,692,003 B2 | 2/2004 | Potter et al. |
| 6,702,289 B1 | 3/2004 | Feola |
| 6,712,694 B1 | 3/2004 | Nordman |
| 6,719,630 B1 | 4/2004 | Seelig et al. |
| 6,722,985 B2 | 4/2004 | Criss-Puszkiewicz et al. |
| 6,726,204 B2 | 4/2004 | Inoue |
| 6,726,565 B2 | 4/2004 | Hughs-Baird |
| 6,729,621 B2 | 5/2004 | Moody |
| 6,733,389 B2 | 5/2004 | Webb et al. |
| 6,746,329 B1 | 6/2004 | Duhamel |
| 6,761,632 B2 | 7/2004 | Bansemer et al. |
| 6,780,109 B2 | 8/2004 | Kaminkow |
| 6,786,818 B1 | 9/2004 | Rothschild et al. |
| 6,789,801 B2 | 9/2004 | Snow |
| 6,796,903 B2 | 9/2004 | Bryant |
| 6,804,763 B1 | 10/2004 | Stockdale et al. |
| 6,805,349 B2 | 10/2004 | Baerlocher et al. |
| 6,805,632 B2 | 10/2004 | Suda |
| 6,808,454 B2 | 10/2004 | Gerrard et al. |
| 6,832,957 B2 | 12/2004 | Falconer |
| 6,835,134 B2 | 12/2004 | Poole et al. |
| 6,837,788 B2 | 1/2005 | Cannon |
| 6,855,056 B2 | 2/2005 | Inoue |
| 6,860,810 B2 | 3/2005 | Cannon et al. |
| 6,863,608 B1 | 3/2005 | LeMay et al. |
| 6,866,583 B2 | 3/2005 | Glavich et al. |
| 6,866,586 B2 | 3/2005 | Oberberger et al. |
| 6,869,360 B2 | 3/2005 | Marks et al. |
| D504,473 S | 4/2005 | Baerlocher |
| 6,880,826 B2 | 4/2005 | Inoue |
| 6,893,018 B2 | 5/2005 | Inoue |
| 6,905,406 B2 | 6/2005 | Kaminkow et al. |
| 6,913,532 B2 | 7/2005 | Baerlocher et al. |
| 6,921,335 B2 | 7/2005 | Rodgers et al. |
| 6,932,700 B2 | 8/2005 | Bennett et al. |
| 6,955,600 B2 | 10/2005 | Glavich et al. |
| 6,960,133 B1 | 11/2005 | Marks et al. |
| 6,991,538 B2 | 1/2006 | Cannon |
| 7,001,274 B2 | 2/2006 | Baerlocher et al. |
| 7,014,560 B2 | 3/2006 | Glavich et al. |
| 7,029,395 B1 | 4/2006 | Baerlocher |

(56) References Cited

U.S. PATENT DOCUMENTS

| | | |
|---|---|---|
| 7,048,275 B2 | 5/2006 | Adams |
| 7,056,213 B2 | 6/2006 | Ching et al. |
| 7,070,502 B1 | 7/2006 | Bussick et al. |
| 7,074,127 B2 | 7/2006 | Cuddy et al. |
| 7,090,580 B2 | 8/2006 | Rodgers et al. |
| 7,094,148 B2 | 8/2006 | Baerlocher et al. |
| 7,111,845 B2 | 9/2006 | Walker et al. |
| 7,156,735 B2 | 1/2007 | Brosnan et al. |
| 7,169,042 B2 | 1/2007 | Muir |
| 7,201,654 B1 | 4/2007 | Jarvis et al. |
| 7,297,059 B2 | 11/2007 | Vancura et al. |
| 7,311,605 B2 | 12/2007 | Moser |
| 7,329,179 B2 | 2/2008 | Baerlocher |
| 7,341,518 B2 | 3/2008 | Muskin |
| 7,347,775 B2 | 3/2008 | Roemer |
| 7,351,146 B2 | 4/2008 | Kaminkow |
| 7,396,279 B2 | 7/2008 | Berman |
| 7,442,123 B2 | 10/2008 | Brill |
| 7,513,826 B2 | 4/2009 | Cuddy |
| 7,553,231 B2 | 6/2009 | Rodgers |
| 7,594,851 B2 | 9/2009 | Falconer |
| 7,611,411 B2 | 11/2009 | Griswold et al. |
| 7,617,151 B2 | 11/2009 | Rowe |
| 7,749,063 B2 | 7/2010 | Belger et al. |
| 7,758,417 B2 | 7/2010 | Jorasch et al. |
| 7,780,517 B2 | 8/2010 | Saffari et al. |
| 7,806,764 B2 | 10/2010 | Brosnan et al. |
| 7,901,294 B2 | 3/2011 | Walker et al. |
| 7,927,212 B2 | 4/2011 | Hedrick et al. |
| 7,988,551 B2 | 8/2011 | Walker et al. |
| 8,016,679 B2 | 9/2011 | Steil et al. |
| 8,137,179 B2 | 3/2012 | Jensen |
| 2001/0009865 A1 | 7/2001 | Demar et al. |
| 2001/0019965 A1 | 9/2001 | Ochi |
| 2002/0010017 A1 | 1/2002 | Bennett |
| 2002/0025844 A1 | 2/2002 | Casey et al. |
| 2002/0025850 A1 | 2/2002 | Hafezi |
| 2002/0045475 A1 | 4/2002 | Glavich et al. |
| 2002/0072402 A1 | 6/2002 | Baerlocher |
| 2002/0077167 A1 | 6/2002 | Merari |
| 2002/0094857 A1 | 7/2002 | Meyer |
| 2002/0142822 A1 | 10/2002 | Baerlocher et al. |
| 2002/0151350 A1 | 10/2002 | Baerlocher et al. |
| 2002/0155883 A1 | 10/2002 | Baerlocher |
| 2002/0193160 A1 | 12/2002 | Tarantino |
| 2003/0013514 A1 | 1/2003 | Cregan et al. |
| 2003/0027628 A1 | 2/2003 | Luciano |
| 2003/0040355 A1 | 2/2003 | Baerlocher |
| 2003/0045344 A1 | 3/2003 | Webb et al. |
| 2003/0045348 A1 | 3/2003 | Palmer et al. |
| 2003/0045354 A1 | 3/2003 | Giobbi |
| 2003/0054875 A1 | 3/2003 | Marks et al. |
| 2003/0060267 A1 | 3/2003 | Glavich et al. |
| 2003/0060272 A1 | 3/2003 | Glavich et al. |
| 2003/0064768 A1 | 4/2003 | Fier |
| 2003/0064795 A1 | 4/2003 | Baerlocher et al. |
| 2003/0064802 A1 | 4/2003 | Rodgers |
| 2003/0069062 A1 | 4/2003 | Shimizu |
| 2003/0073483 A1 | 4/2003 | Glavich et al. |
| 2003/0073497 A1 | 4/2003 | Nelson |
| 2003/0137110 A1 | 7/2003 | Huard et al. |
| 2003/0144053 A1 | 7/2003 | Michaelson |
| 2003/0162585 A1 | 8/2003 | Bigelow et al. |
| 2003/0203752 A1 | 10/2003 | Kaminkow et al. |
| 2003/0203753 A1 | 10/2003 | Muir et al. |
| 2003/0203756 A1 | 10/2003 | Jackson |
| 2003/0216165 A1 | 11/2003 | Singer et al. |
| 2004/0002372 A1 | 1/2004 | Rodgers et al. |
| 2004/0002379 A1 | 1/2004 | Parrott et al. |
| 2004/0009803 A1 | 1/2004 | Bennett et al. |
| 2004/0012145 A1 | 1/2004 | Inoue |
| 2004/0014516 A1 | 1/2004 | Inoue |
| 2004/0014517 A1 | 1/2004 | Inoue |
| 2004/0018866 A1 | 1/2004 | Inoue |
| 2004/0026854 A1 | 2/2004 | Inoue |
| 2004/0033827 A1 | 2/2004 | Gilmore et al. |
| 2004/0036218 A1 | 2/2004 | Inoue |
| 2004/0038726 A1 | 2/2004 | Inoue |
| 2004/0038731 A1 | 2/2004 | Englman |
| 2004/0043815 A1 | 3/2004 | Kaminkow |
| 2004/0048650 A1 | 3/2004 | Mierau et al. |
| 2004/0048652 A1 | 3/2004 | Ching et al. |
| 2004/0053666 A1 | 3/2004 | Vancura |
| 2004/0053669 A1 | 3/2004 | Gerrard et al. |
| 2004/0053672 A1 | 3/2004 | Baerlocher |
| 2004/0053676 A1 | 3/2004 | Rodgers |
| 2004/0063492 A1 | 4/2004 | Baerlocher et al. |
| 2004/0070146 A1 | 4/2004 | Snow |
| 2004/0072612 A1 | 4/2004 | Rodgers et al. |
| 2004/0084843 A1 | 5/2004 | Snow |
| 2004/0087369 A1 | 5/2004 | Tanaka et al. |
| 2004/0090003 A1 | 5/2004 | Snow |
| 2004/0090005 A1 | 5/2004 | Snow |
| 2004/0137982 A1 | 7/2004 | Cuddy et al. |
| 2004/0147306 A1 | 7/2004 | Randall et al. |
| 2004/0147314 A1 | 7/2004 | LeMay et al. |
| 2004/0152509 A1 | 8/2004 | Hornik et al. |
| 2004/0155399 A1 | 8/2004 | Inoue |
| 2004/0183251 A1 | 9/2004 | Inoue |
| 2004/0192431 A1 | 9/2004 | Singer et al. |
| 2004/0195773 A1 | 10/2004 | Masci et al. |
| 2004/0219968 A1 | 11/2004 | Fiden et al. |
| 2004/0242313 A1 | 12/2004 | Munoz |
| 2004/0266516 A1 | 12/2004 | Thomas |
| 2004/0266517 A1 | 12/2004 | Bleich et al. |
| 2005/0020344 A1 | 1/2005 | Kaminkow |
| 2005/0043083 A1 | 2/2005 | Inoue |
| 2005/0043084 A1 | 2/2005 | Inoue |
| 2005/0049035 A1 | 3/2005 | Baerlocher et al. |
| 2005/0054431 A1 | 3/2005 | Walker et al. |
| 2005/0059478 A1 | 3/2005 | Peterson et al. |
| 2005/0064924 A1 | 3/2005 | Glavich |
| 2005/0070354 A1 | 3/2005 | Baerlocher et al. |
| 2005/0075163 A1 | 4/2005 | Cuddy et al. |
| 2005/0085288 A1 | 4/2005 | Schugar et al. |
| 2005/0104298 A1 | 5/2005 | Butcher et al. |
| 2005/0107158 A1 | 5/2005 | Kanisawa et al. |
| 2005/0148384 A1 | 7/2005 | Marks |
| 2005/0153778 A1 | 7/2005 | Nelson et al. |
| 2005/0192099 A1 | 9/2005 | Nguyen et al. |
| 2005/0233801 A1 | 10/2005 | Baerlocher et al. |
| 2005/0233803 A1 | 10/2005 | Yang |
| 2005/0239542 A1 | 10/2005 | Olsen |
| 2005/0266917 A1 | 12/2005 | Glavich et al. |
| 2005/0277460 A1 | 12/2005 | Inoue |
| 2006/0030392 A1 | 2/2006 | Rodgers |
| 2006/0035707 A1 | 2/2006 | Nguyen et al. |
| 2006/0040728 A1 | 2/2006 | Fuller |
| 2006/0040732 A1 | 2/2006 | Baerlocher et al. |
| 2006/0046823 A1 | 3/2006 | Kaminkow et al. |
| 2006/0046830 A1 | 3/2006 | Webb |
| 2006/0068875 A1 | 3/2006 | Cregan |
| 2006/0068884 A1 | 3/2006 | Baerlocher et al. |
| 2006/0073876 A1 | 4/2006 | Cuddy |
| 2006/0073882 A1 | 4/2006 | Rozkin et al. |
| 2006/0089191 A1 | 4/2006 | Singer |
| 2006/0092019 A1 | 5/2006 | Fallon |
| 2006/0128457 A1 | 6/2006 | Cannon |
| 2006/0154722 A1 | 7/2006 | Walker et al. |
| 2006/0211473 A1 | 9/2006 | Walker et al. |
| 2006/0247010 A1 | 11/2006 | Gagner |
| 2006/0252508 A1 | 11/2006 | Walker et al. |
| 2007/0054726 A1 | 3/2007 | Muir et al. |
| 2007/0060314 A1 | 3/2007 | Baerlocher et al. |
| 2007/0060321 A1 | 3/2007 | Vasquez et al. |
| 2007/0102877 A1 | 5/2007 | Personius et al. |
| 2007/0155482 A1 | 7/2007 | Walker et al. |
| 2007/0155483 A1 | 7/2007 | Walker et al. |
| 2007/0155484 A1 | 7/2007 | Walker et al. |
| 2007/0191088 A1 | 8/2007 | Breckner et al. |
| 2007/0243925 A1 | 10/2007 | LeMay et al. |
| 2007/0273097 A1 | 11/2007 | Kirkutis |
| 2007/0293293 A1 | 12/2007 | Baerlocher et al. |
| 2007/0293306 A1 | 12/2007 | Nee et al. |

(56) References Cited

U.S. PATENT DOCUMENTS

| | | | |
|---|---|---|---|
| 2008/0009334 A1 | 1/2008 | Walker et al. |
| 2008/0067745 A1 | 3/2008 | Wikstrom |
| 2008/0076496 A1 | 3/2008 | Baerlocher et al. |
| 2008/0076531 A1 | 3/2008 | Baerlocher et al. |
| 2008/0076532 A1 | 3/2008 | Graham et al. |
| 2008/0076542 A1 | 3/2008 | Iddings et al. |
| 2008/0102934 A1 | 5/2008 | Tan |
| 2008/0108425 A1 | 5/2008 | Oberberger |
| 2008/0113735 A1 | 5/2008 | Maya |
| 2008/0146344 A1 | 6/2008 | Rowe et al. |
| 2008/0176635 A1 | 7/2008 | Randall |
| 2009/0209333 A1 | 8/2009 | Kelly et al. |
| 2010/0016062 A1 | 1/2010 | Baerlocher |
| 2010/0248821 A1 | 9/2010 | Jorasch et al. |
| 2011/0111842 A1 | 5/2011 | Walker et al. |

FOREIGN PATENT DOCUMENTS

| | | |
|---|---|---|
| AU | 199650327 | 10/1997 |
| AU | 199747657 | 12/1997 |
| AU | 199863553 | 10/1998 |
| AU | 199917318 | 9/1999 |
| AU | 778685 | 4/2005 |
| DE | 3105266 | 9/1982 |
| DE | 3700861 | 7/1988 |
| DE | 4014477 | 7/1991 |
| EP | 0060019 | 9/1982 |
| EP | 0410789 | 2/1990 |
| EP | 0737494 | 12/1994 |
| EP | 0688002 | 12/1995 |
| EP | 0798676 | 10/1997 |
| EP | 0874337 | 10/1998 |
| EP | 0926645 | 6/1999 |
| EP | 0944030 | 9/1999 |
| EP | 0945837 | 9/1999 |
| EP | 0981119 | 2/2000 |
| EP | 0984408 | 3/2000 |
| EP | 1039424 | 3/2000 |
| EP | 1063622 | 5/2000 |
| EP | 0984409 | 8/2000 |
| EP | 1184822 | 3/2002 |
| EP | 1296296 | 3/2003 |
| EP | 1513117 | 3/2005 |
| GB | 869755 | 6/1957 |
| GB | 1298681 | 12/1972 |
| GB | 1464896 | 2/1977 |
| GB | 2066991 | 7/1981 |
| GB | 2072395 | 9/1981 |
| GB | 2083936 | 3/1982 |
| GB | 2084371 | 4/1982 |
| GB | 2092797 | 8/1982 |
| GB | 2096376 | 10/1982 |
| GB | 2097160 | 10/1982 |
| GB | 2098778 | 11/1982 |
| GB | 2101380 | 1/1983 |
| GB | 2106292 | 4/1983 |
| GB | 2117155 | 10/1983 |
| GB | 2144644 | 3/1985 |
| GB | 2161008 | 1/1986 |
| GB | 2170636 | 8/1986 |
| GB | 2180087 | 3/1987 |
| GB | 2181589 | 4/1987 |
| GB | 2183882 | 6/1987 |
| GB | 2193827 | 2/1988 |
| GB | 2201821 | 9/1988 |
| GB | 2202984 | 10/1988 |
| GB | 2222712 | 3/1990 |
| GB | 2226436 | 6/1990 |
| GB | 2253300 | 2/1992 |
| GB | 2322217 | 8/1998 |
| GB | 2328311 | 2/1999 |
| GB | 2353128 | 2/2001 |
| JP | 63237970 | 10/1988 |
| JP | 2000109267 | 4/2000 |
| WO | WO/93/03464 | 2/1993 |
| WO | WO/96/09102 | 3/1996 |
| WO | WO/97/32285 | 9/1997 |
| WO | WO/99/10849 | 3/1999 |
| WO | WO/00/12186 | 3/2000 |
| WO | WO/00/32286 | 6/2000 |
| WO | WO/00/59591 | 10/2000 |
| WO | WO/00/66235 | 11/2000 |
| WO | WO/00/76606 | 12/2000 |
| WO | WO/01/82245 | 1/2001 |
| WO | WO/01/26019 | 4/2001 |
| WO | WO/02/099760 | 12/2002 |
| WO | WO/2004/025584 | 3/2004 |
| WO | WO/2005/079242 | 9/2005 |

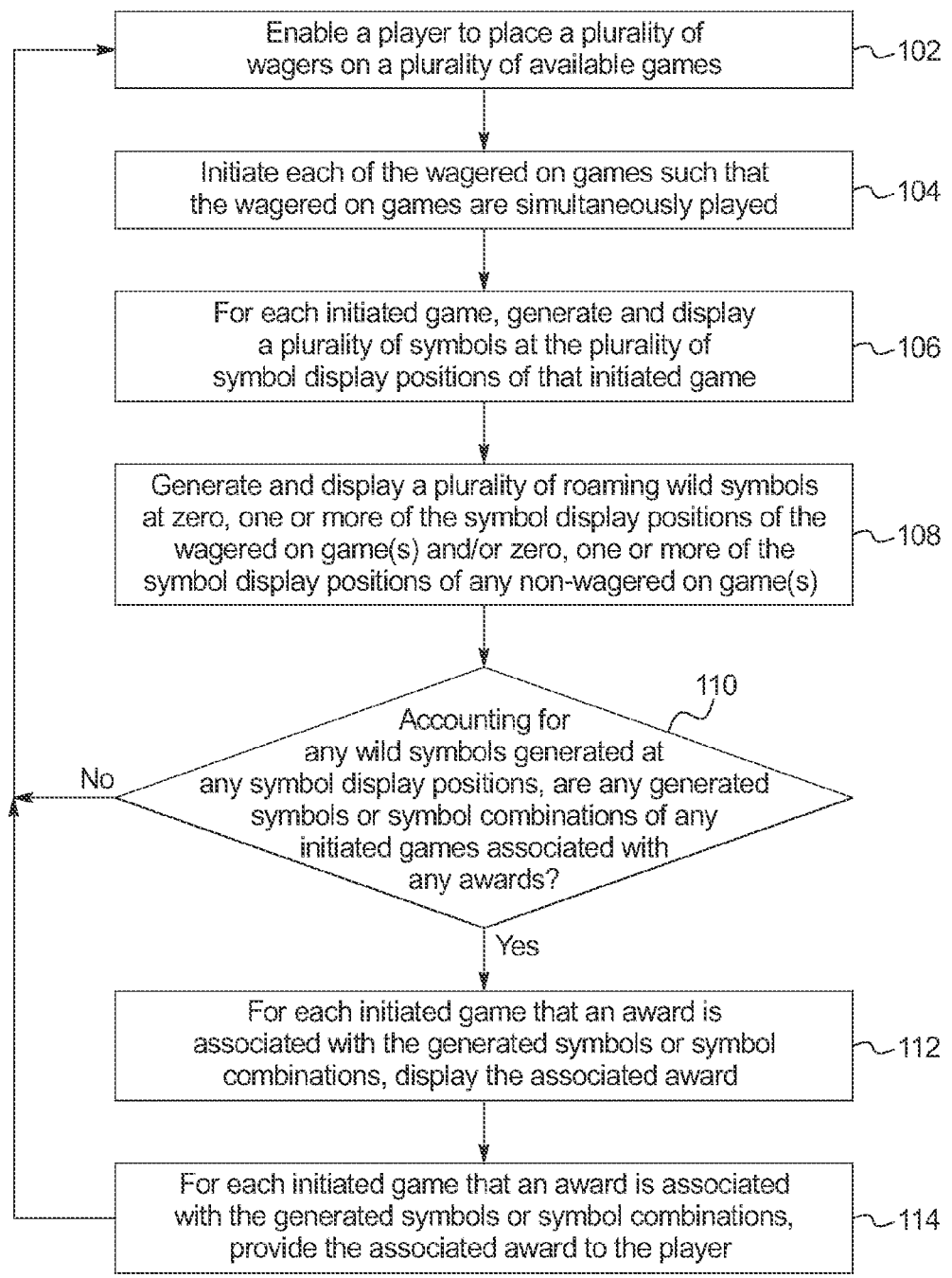

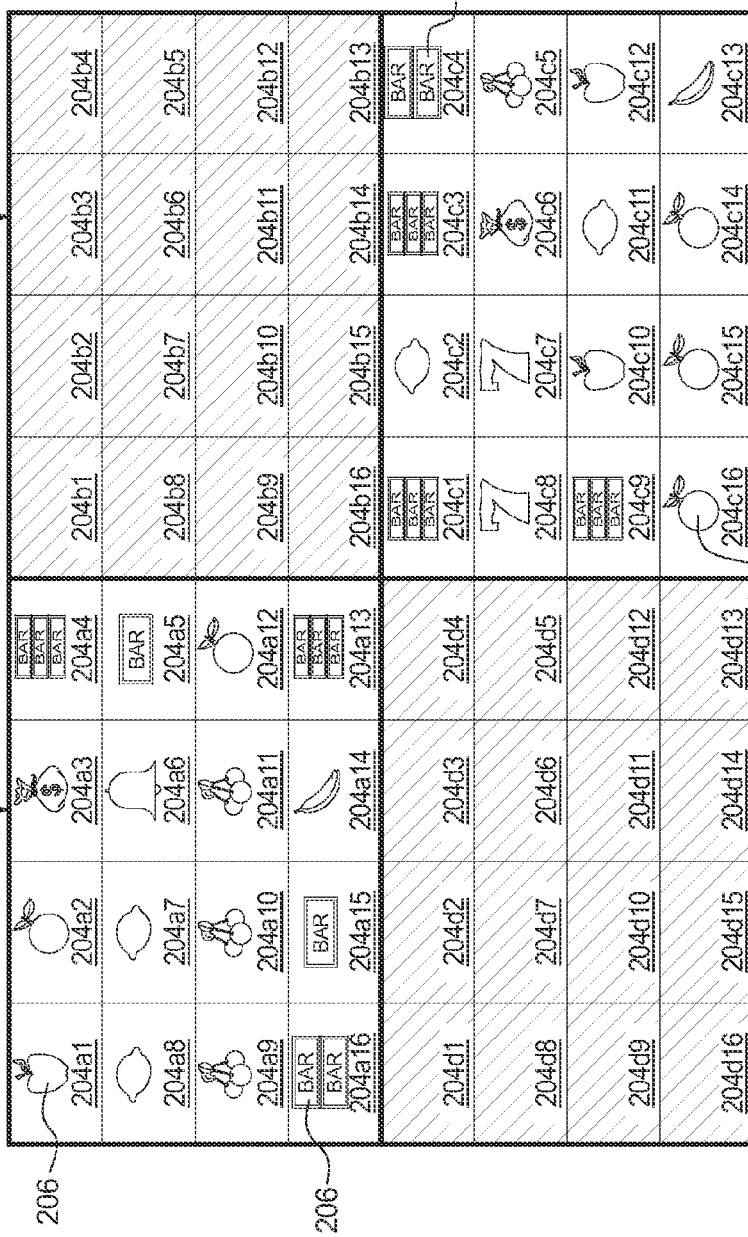

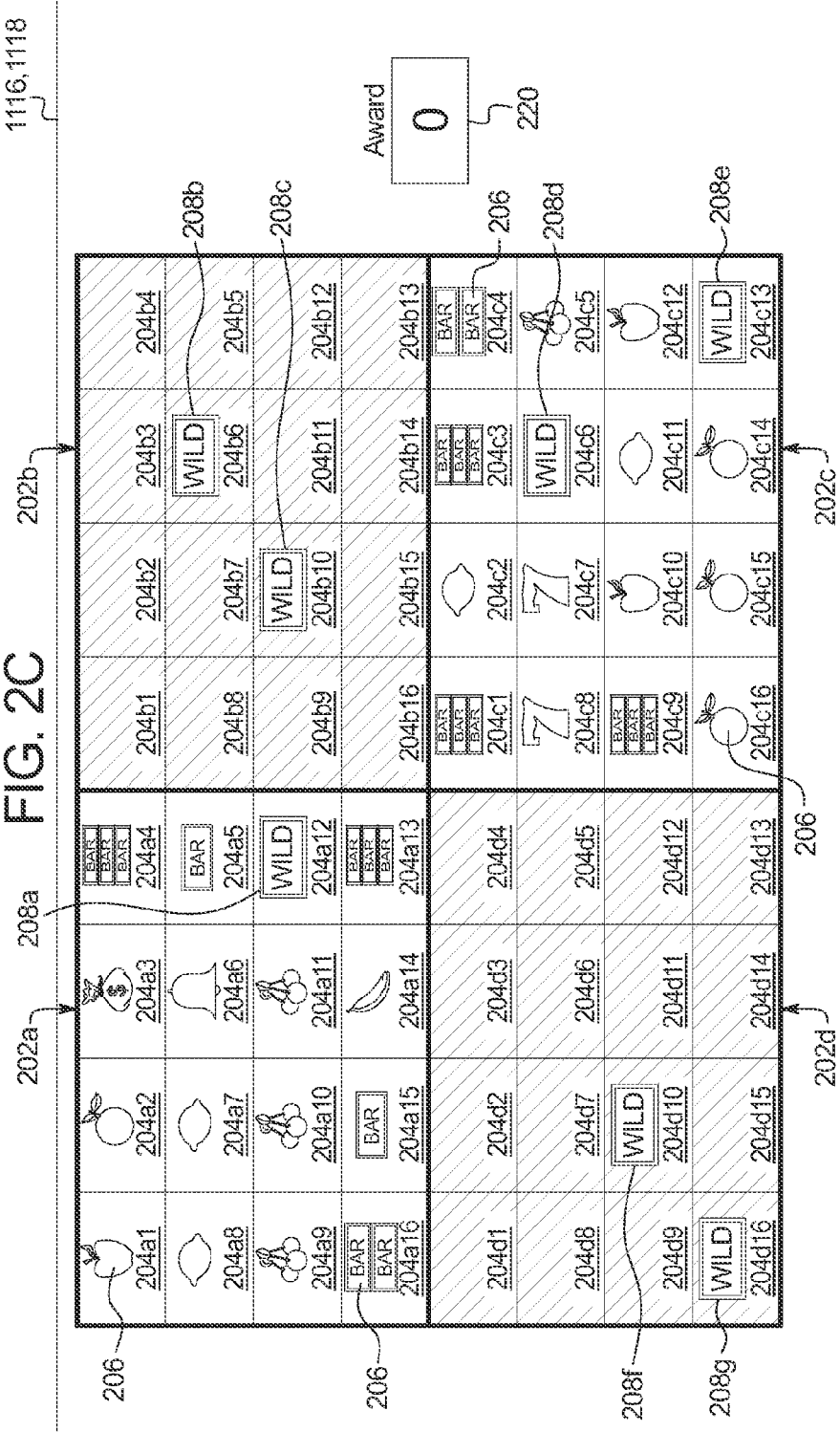

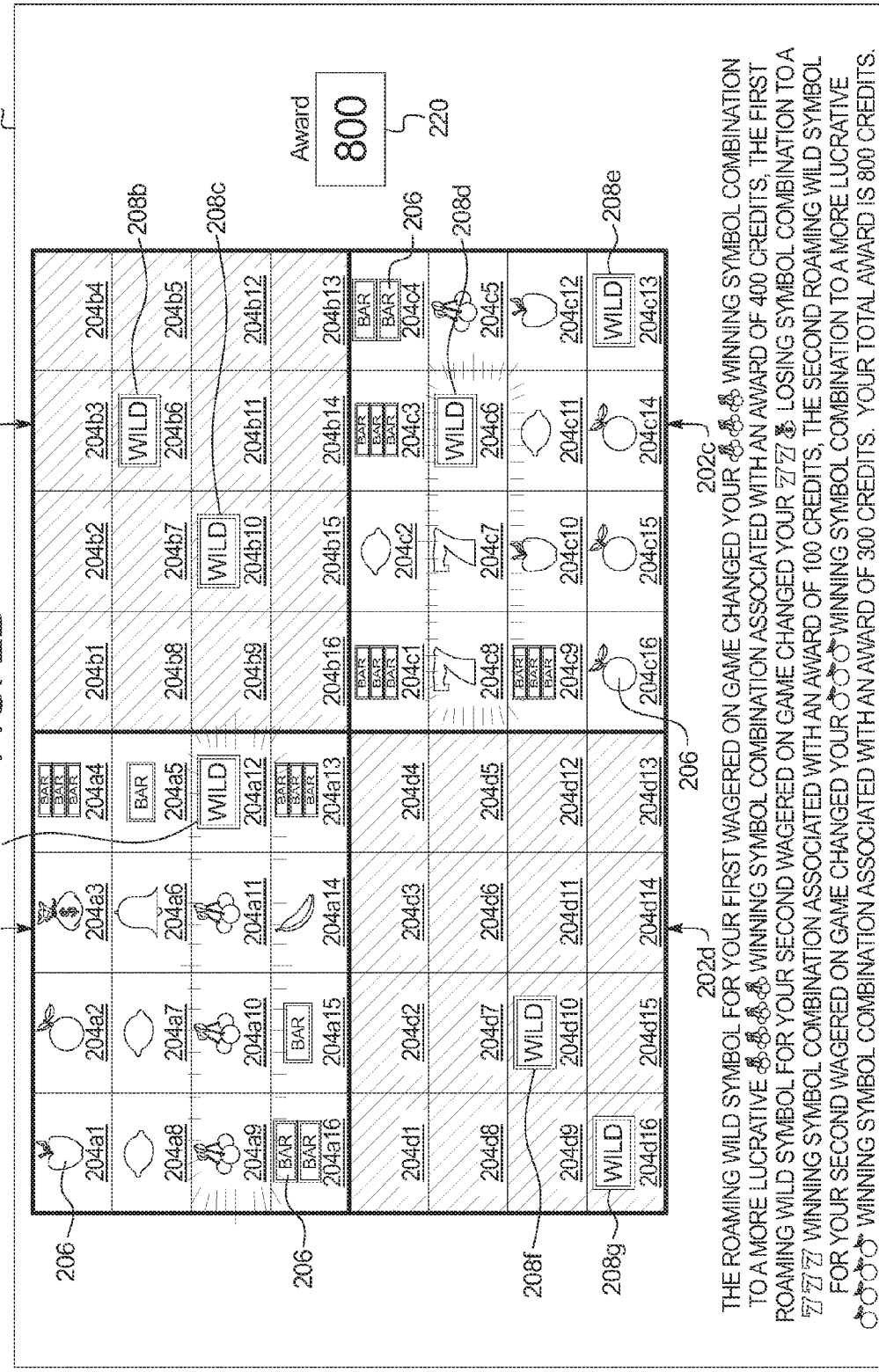

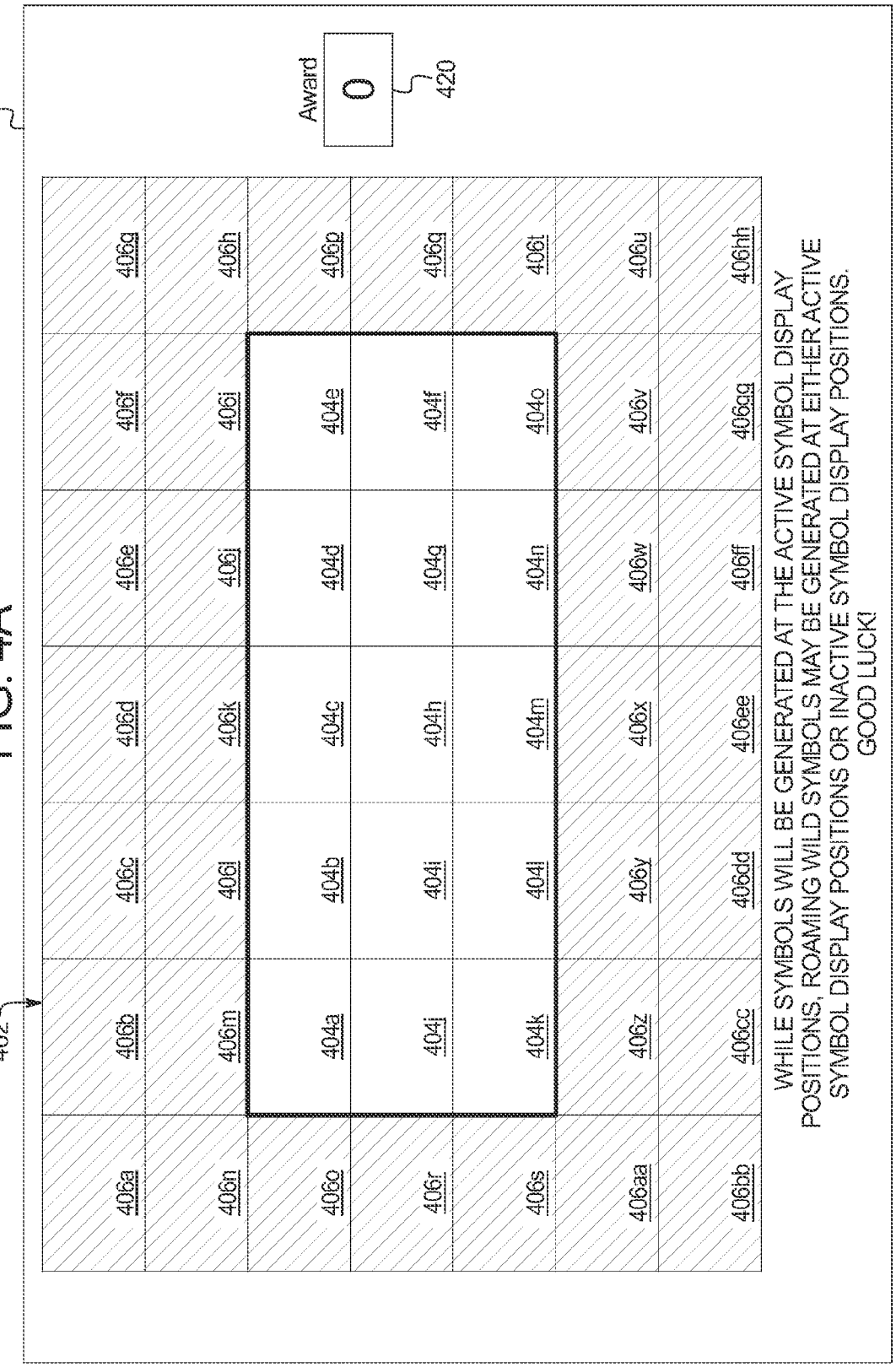

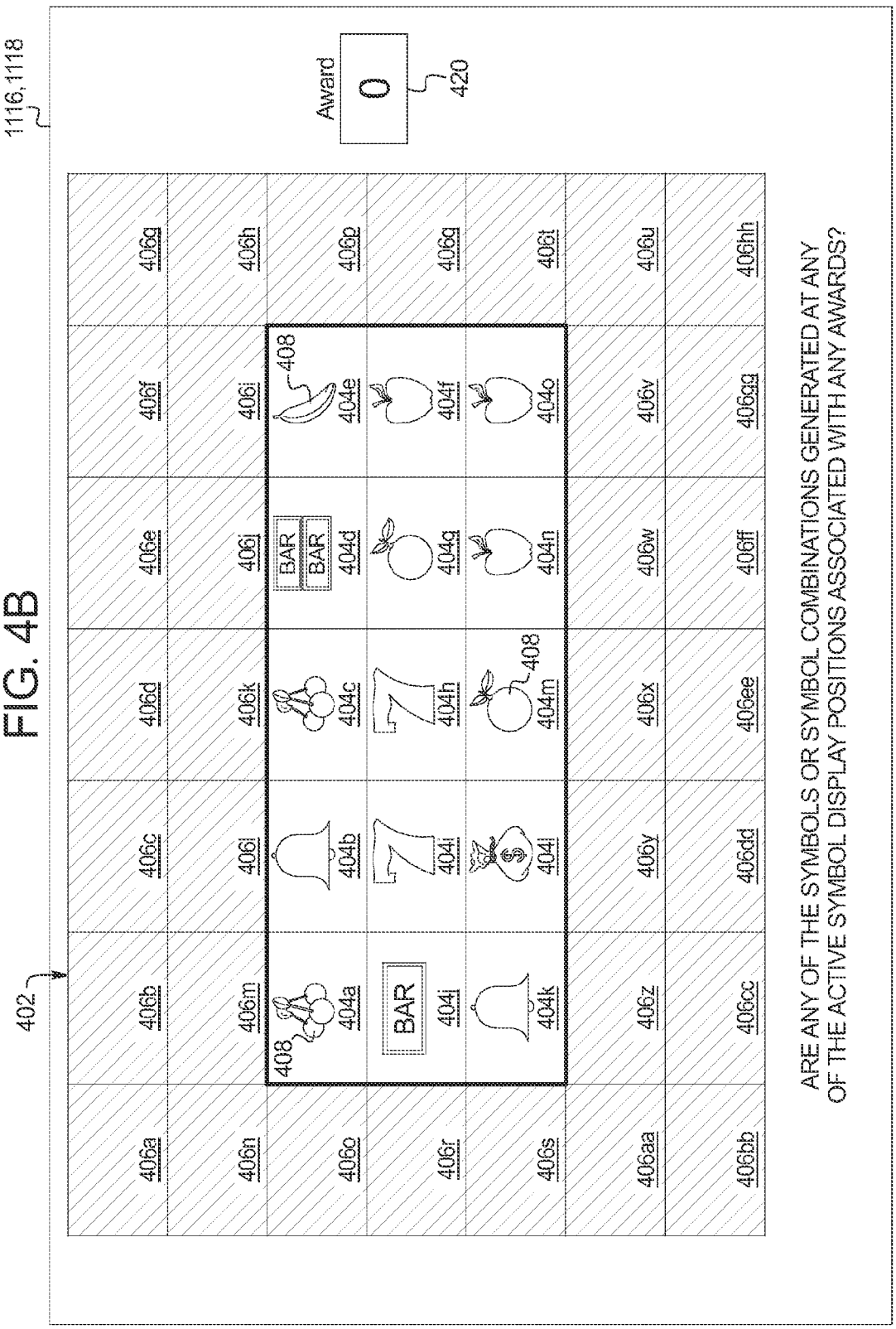

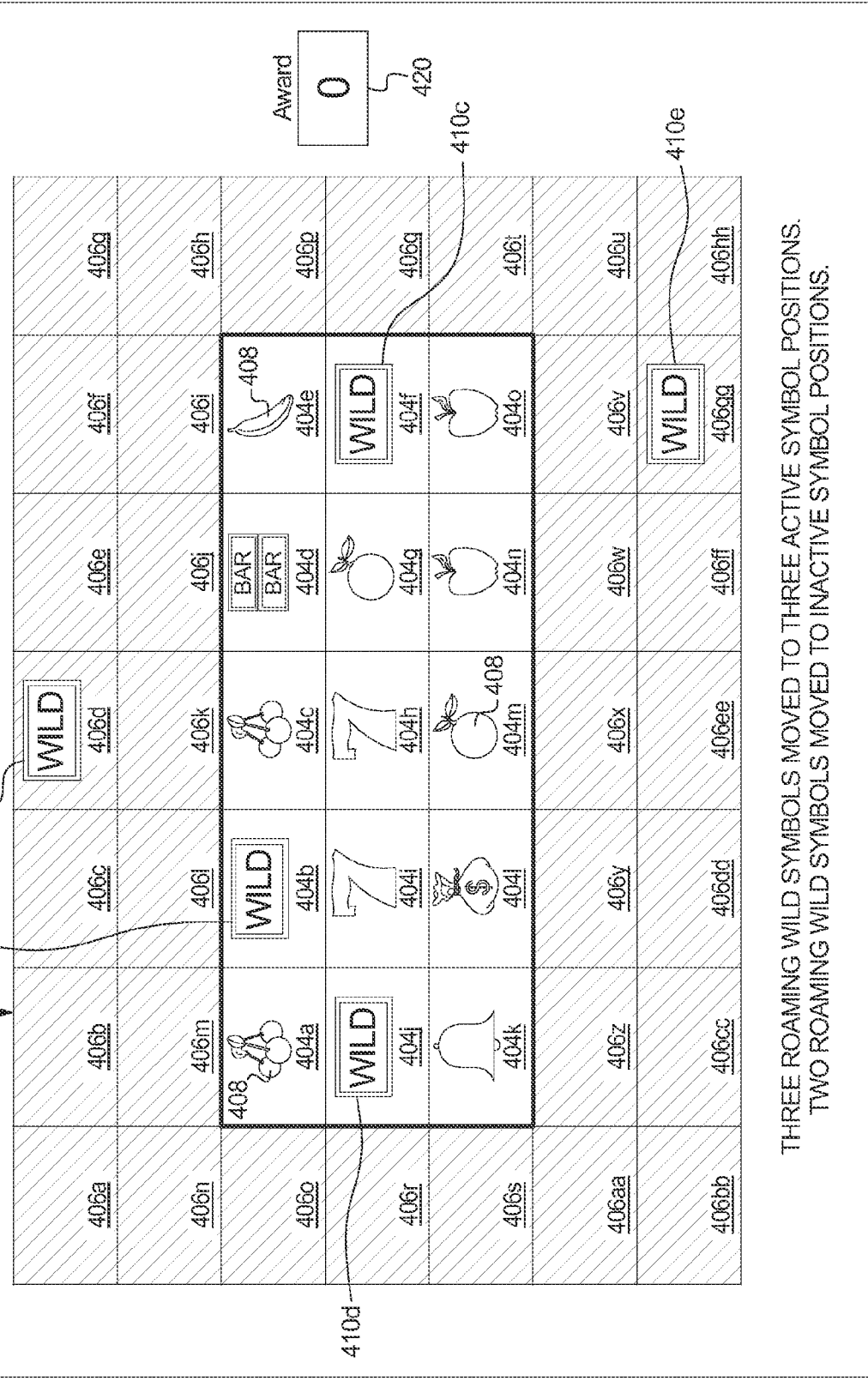

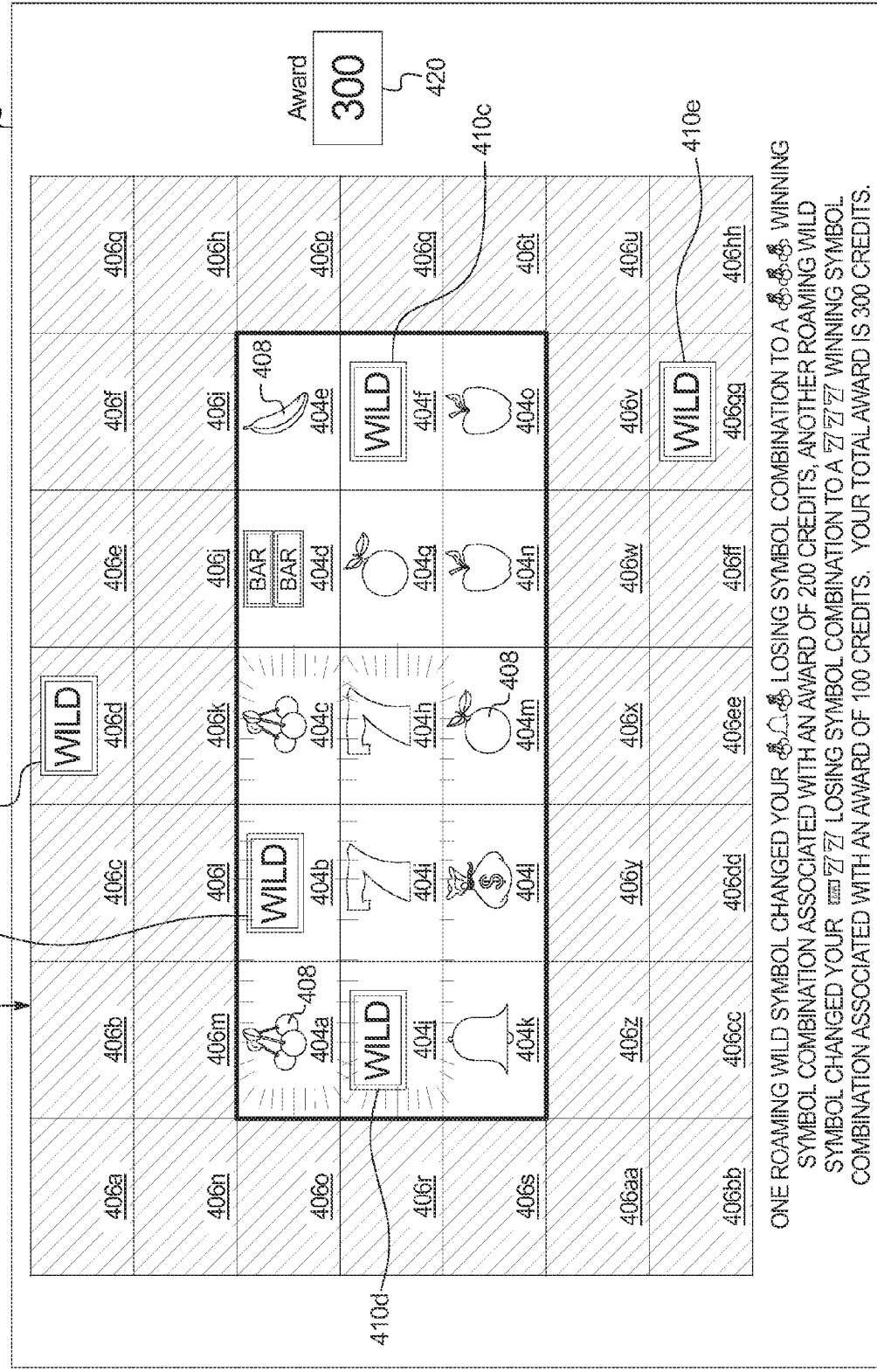

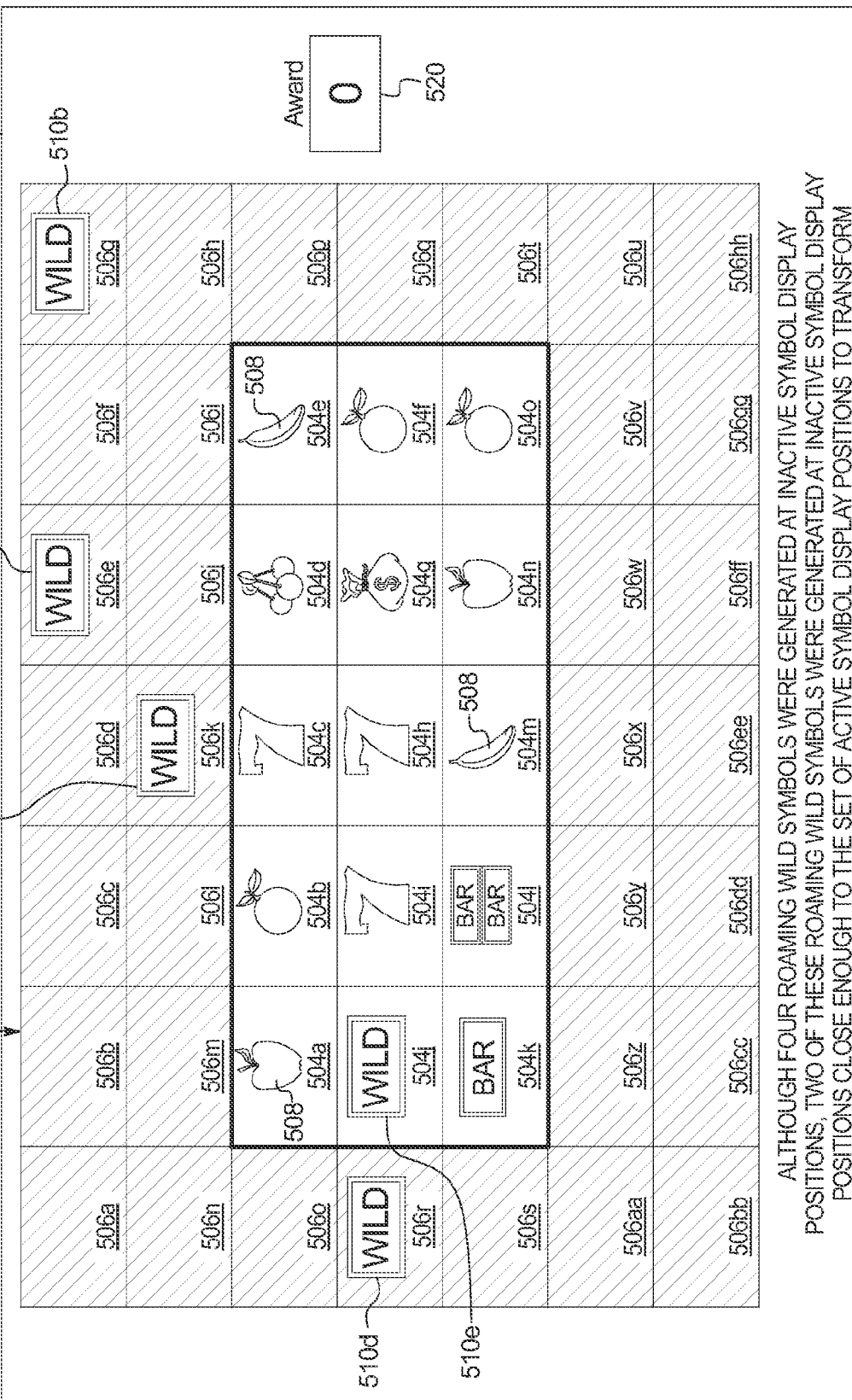

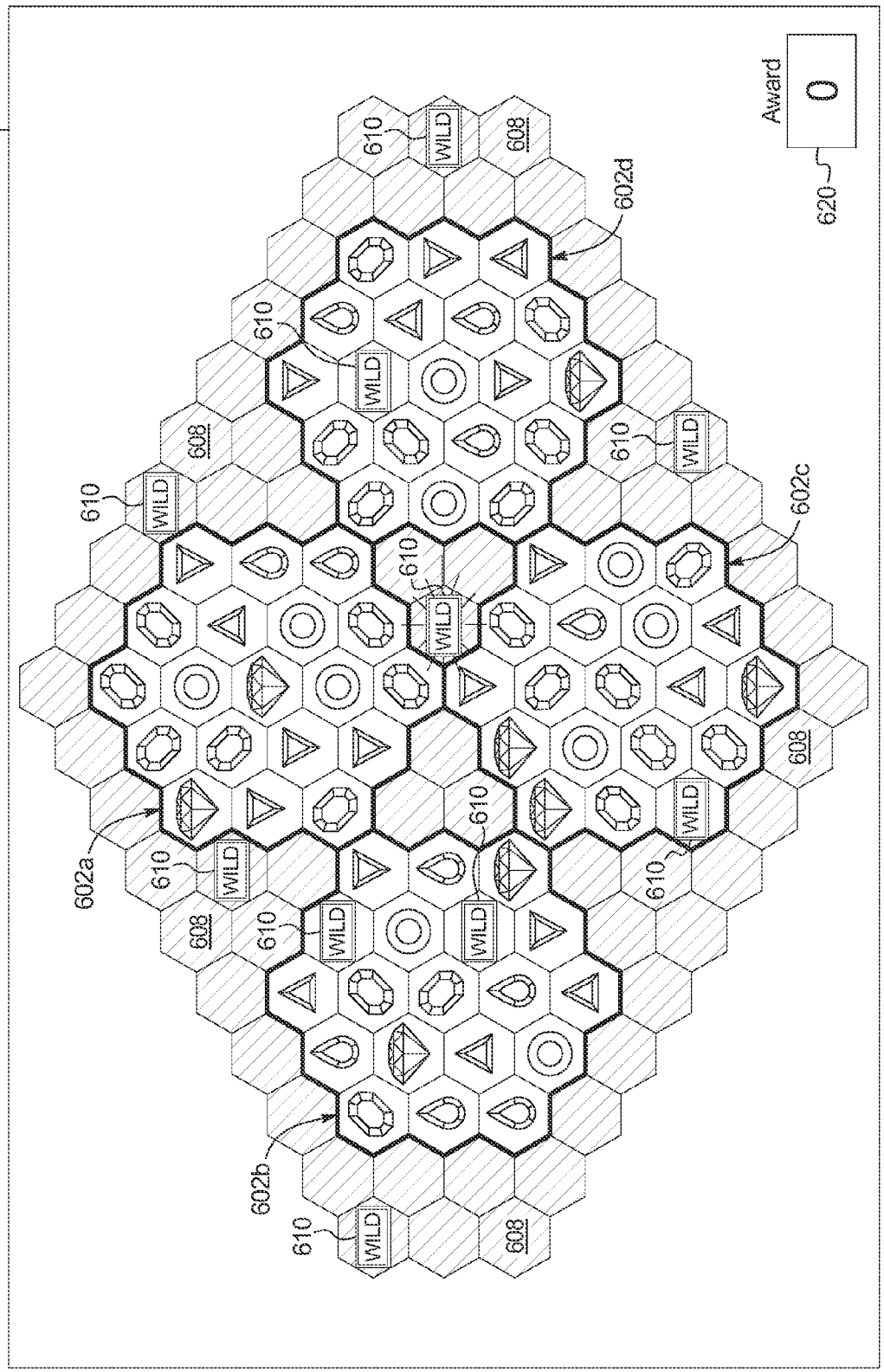

US 9,466,169 B2

GAMING SYSTEM AND METHOD FOR PROVIDING A GAME INCLUDING ROAMING WILD SYMBOLS

PRIORITY CLAIM

This application is a continuation of, claims the benefit of and priority to U.S. patent application Ser. No. 13/790,759, filed on Mar. 8, 2013, the entire contents of which is incorporated by reference herein.

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate a primary or base game. Certain known gaming machines enable a player to wager on and play a plurality of primary or base games simultaneously or concurrently. In many of these gaming machines, the award for each played primary game is based on the player obtaining a winning symbol or symbol combination and on the amount of the wager placed on that primary game (e.g., the higher the wager, the higher the award). Generally, symbols or symbol combinations which are less likely to occur usually provide higher awards.

Certain known gaming machines include a plurality of reels. Each reel includes a plurality of symbols. After a player places a wager on the game, the reels spin and then stop to display a generated combination of symbols on the reels. If a winning symbol or winning combination of symbols is/are generated along an active payline associated with the reels (or in a scatter pay configuration), the player receives the award associated with the generated winning symbol or generated winning combination of symbols. Certain players become frustrated if they "almost win an award" when the symbols necessary for a winning combination substantially appear on the reels but are missing a symbol or are not in the proper configuration or order to produce a winning combination.

One popular game feature which attempts to resolve such frustration in these situations and increase the player's award opportunities is a wild symbol. A wild symbol changes, replaces or functions as one of the symbols on one of the reels after the reels initially spin and stop. Such wild symbols enable a first or non-winning combination of symbols to change to a second and possibly winning combination of symbols (e.g., to make a winning combination or align a winning combination on an active payline).

As wild symbols increase the level of enjoyment and excitement for certain players, there is a continuing need to employ wild symbols in new and different games.

SUMMARY

In various embodiments, the present disclosure relates generally to gaming systems and methods for providing one or more games employing roaming wild symbols.

In certain embodiments, the gaming system and method disclosed herein enables a player to simultaneously, concurrently or overlappingly play a plurality of games, wherein one or more roaming wild symbols are persistently active across the plurality of available to be played games. In these embodiments, each game includes a distinct set or plurality of symbol display positions and, at any particular point in time, each roaming wild symbol is then associated with one of the symbol display positions of one of the sets of symbol display positions of one of the played or unplayed games. Accordingly, for each play of at least one of the plurality of available games, each of the roaming wild symbols will be associated with a symbol display position of one of the plurality of games, wherein whether or not the player may benefit from a roaming wild symbol is based on whether that roaming wild symbol is randomly associated with: (i) a symbol display position of a wagered on played game, or (ii) a symbol display position of a non-wagered on, non-played game.

In operation of various embodiments, the gaming system enables a player to wager on one or more of a plurality of available games. For each wagered on game, the gaming system simultaneously, concurrently or overlappingly generates and displays a plurality of symbols at a plurality of symbol display positions associated with that game. In addition to such symbol generation(s), for each available game, the gaming system randomly generates and displays each of the roaming wild symbols at one or more of the symbol display positions of one or more of the sets of symbol display positions. It should be appreciated that while the gaming system generates symbols at the symbol display positions of the wagered on games (and does not generate symbols at the symbol display positions of any non-wagered on games), the gaming system of this embodiment can generate roaming wild symbols at the symbol display positions of the wagered on games and/or the symbol display positions of any non-wagered on games. Accordingly, if a player increases the quantity of wagered on games simultaneously or overlapping played, the player increases the probability of utilizing a roaming wild symbol in one or more of such wagered on games.

Following the generation of symbols at the symbol display positions of the wagered on games and the generation of roaming wild symbols at the symbol display positions of wagered on games and/or any non-wagered on games, the gaming system determines, for each wagered on game, whether any roaming wild symbols are generated at (i.e., have moved to) any of the symbol display positions associated with that game. If the gaming system generated a roaming wild symbol at a symbol display position, the gaming system causes that wild symbol to function as or otherwise change to a different symbol, such as a symbol that causes a non-winning symbol combination to become a winning symbol combination. In one such embodiment, if the gaming system generates a plurality of roaming wild symbols at a single symbol display position, the gaming system triggers or activates a feature, such as applying a modifier, and causes the wild symbol(s) to function as or otherwise change to different symbol(s). In these embodiments, following such generations and determinations, for each wagered on game, the gaming system determines, when accounting for any wild symbols moved to any symbol display positions, whether the symbols of the symbol display positions of that played game form any winning symbol combinations. The gaming system then determines and displays any awards associated with any formed winning symbol combinations for each wagered on game simultaneously or overlappingly played.

It should be appreciated that since the roaming wild symbols may be generated at (i.e., move to) any symbol display position of any played game (of the plurality of available games) or any unplayed game (of the plurality of available games), the gaming system randomly generates each of the roaming wild symbols when at least one of the plurality of available games are wagered on and played. Such a configuration provides that: (i) if the player wagers on each of the available games, the player is ensured to utilize each of the roaming wild symbols, and (ii) if the player wagers on less than each of the available games, the player is not ensured to utilize each of the roaming wild symbols. Accordingly, a gaming system of these embodiments increase an amount of excitement and enjoyment for certain players because such players enjoy knowing that if they place a wager on each of the available games, the player is ensured to utilize each of the roaming wild symbols, wherein which game(s) utilize which roaming wild symbols is randomly determined.

In one such embodiment, the gaming system includes enabling a player to wager on each of a plurality of games, wherein each of the wagered on games is overlappingly played, and for each wagered on game, randomly generating a plurality of symbols at a plurality of symbol display positions associated with the wagered on game. In this embodiment, for each of a plurality of wild symbols, the gaming system includes displaying the wild symbol at one of the symbol display positions of one of the plurality of games, wherein independent of whether the player wagered on each of the plurality of games, the wild symbol is configured to be displayed at at least one of the symbol display positions of any of the plurality of games. For each wagered on game, the gaming system of this embodiment includes determining any awards associated with the generated symbols and any wild symbols displayed at any of the symbol display positions associated with the wagered on game, and displaying any determined awards to the player.

In certain different embodiments, the gaming system and method disclosed herein enables a player to play a game including a plurality of active symbol display positions, a plurality of inactive symbol display positions and one or more roaming wild symbols. In these embodiments, the roaming wild symbols move between, are generated at or are otherwise associated with active symbol display positions and inactive symbol display positions. Accordingly, for each play of a game, the gaming system generates each of the roaming wild symbols at a symbol display position, wherein whether or not the player may benefit from a roaming wild symbol is based on whether the gaming system randomly generated that roaming wild symbol at: (i) an active symbol display position, or (ii) an inactive symbol display position.

In operation of various embodiments, for a wagered on play of a game, the gaming system displays a plurality of active symbol display positions and a plurality of inactive symbol display positions. The gaming system of these embodiments: (i) generates a plurality symbols at the plurality of active symbol display positions, (ii) generates zero, one or more roaming wild symbols at zero, one or more active symbol display positions, and (iii) generates zero, one or more roaming wild symbols at zero, one or more inactive symbol display positions. Following such generations, the gaming system determines whether any roaming wild symbols are displayed at (i.e., have moved to) any of the active symbol display positions. If a roaming wild symbol is displayed at (i.e., has moved to) one of the active symbol display positions, the gaming system causes that wild symbol to function as or otherwise change to a different symbol, such as a symbol that causes a non-winning symbol combination to become a winning symbol combination. In one such embodiment, if the gaming system generates a plurality of roaming wild symbols at a single active symbol display position, the gaming system triggers or activates feature, such as applying a modifier, and causes the wild symbol(s) to function as or otherwise change to different symbol(s). In these embodiments, the gaming system determines, when accounting for any wild symbols displayed to any active symbol display positions, whether the symbols of the active symbol display positions form any winning symbol combinations. The gaming system then determines and displays any awards associated with any formed winning symbol combinations.

It should be appreciated that by displaying each of a quantity of roaming wild symbols for each play of a game, the gaming system enables a player to gain a better sense or understanding of the frequency of the roaming wild symbols feature. That is, for each game played, the gaming system enables the player to witness that a roaming wild symbol feature is employed (regardless of whether the roaming wild symbols move to active or inactive symbol display positions) and that a quantity of roaming wild symbols may be associated with zero, one or more active symbol display positions. Such a configuration increases the level of anticipation for certain players by conveying to such players that the roaming wild symbols feature is employed without otherwise having to generate any particular outcome or provide otherwise burdensome informational messaging to the player.

In one such embodiment, the gaming system includes, for a play of a wagered on game, displaying a plurality of symbol display positions including a plurality of active symbol display positions and a plurality of inactive symbol display positions. The gaming system of this embodiment includes randomly generating a plurality of symbols at the plurality of active symbol display positions, and displaying a plurality of wild symbols at a plurality of the symbol display positions, wherein for each of the wild symbols, the wild symbol is configured to be displayed at any of the active symbol display positions and any of the inactive symbol display positions. The gaming system of this embodiment also includes determining any awards associated with the generated symbols and any wild symbols displayed at the active symbol display positions, and displaying any determined awards.

Accordingly, different embodiments of the gaming system disclosed herein increase the level of excitement and enjoyment for certain players by employing one or more roaming wild symbols which move to (i.e., are generated at) different symbol display positions for different plays of different games. Such employment of these roaming wild symbols provide players with additional opportunities to obtain winning symbol combinations and thus provide players additional opportunities to win one or more awards.

Additional features and advantages are described in, and will be apparent from, the following Detailed Description and the figures.

BRIEF DESCRIPTION OF THE FIGURES

FIG. 1 is a flow chart an example process for operating a gaming system providing one embodiment of a plurality of simultaneously or overlappingly played games employing roaming wild symbols as disclosed herein.

FIGS. 2A, 2B, 2C and 2D are front views of one embodiment of the gaming system disclosed herein illustrating an example of a plurality of simultaneously or overlappingly played games employing roaming wild symbols.

FIGS. 4A, 4B, 4C and 4D are front views of one embodiment of the gaming system disclosed herein illustrating an example of a game with active symbol display positions, inactive symbol display positions and one or more roaming wild symbols.

FIG. 5 is a front view of one embodiment of the gaming system disclosed herein illustrating an example of a game with active symbol display positions, inactive symbol display positions, designated inactive symbol display positions and one or more roaming wild symbols.

FIG. 6B is a front view of one embodiment of the gaming system disclosed herein illustrating an example of a plurality of simultaneously or overlappingly played games with active symbol display positions, inactive symbol display positions designated inactive symbol display positions and one or more roaming wild symbols.

DETAILED DESCRIPTION

Roaming Wild Symbols

In various embodiments, the gaming system disclosed herein relates generally to gaming systems and methods for providing one or more games employing roaming wild symbols.

While the embodiments described below are directed to a primary or base game, it should be appreciated that the present disclosure may additionally or alternatively be employed in association with a secondary or bonus game. Moreover, while the player's credit balance, the player's wager, and any awards are displayed as an amount of monetary credits or currency in certain of the embodiments described below, one or more of such player's credit balance, such player's wager, and any awards provided to such a player may be for non-monetary credits, promotional credits, and/or player tracking points or credits.

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In various embodiments, the gaming system enables a player to place a plurality of wagers on a plurality of available games as indicated in block 102. In one such embodiment, the gaming system enables the player to place a plurality of wagers on the plurality of available games upon an occurrence of a roaming wild symbols game triggering event. In these embodiments, each of the plurality of games which the gaming system enables the player to wager on include a plurality or set of symbol display positions. In one such embodiment, each available game includes a distinct plurality or set of reels which is associated with or otherwise corresponds to the plurality or set of symbol display positions for that game.

Figure 2A:
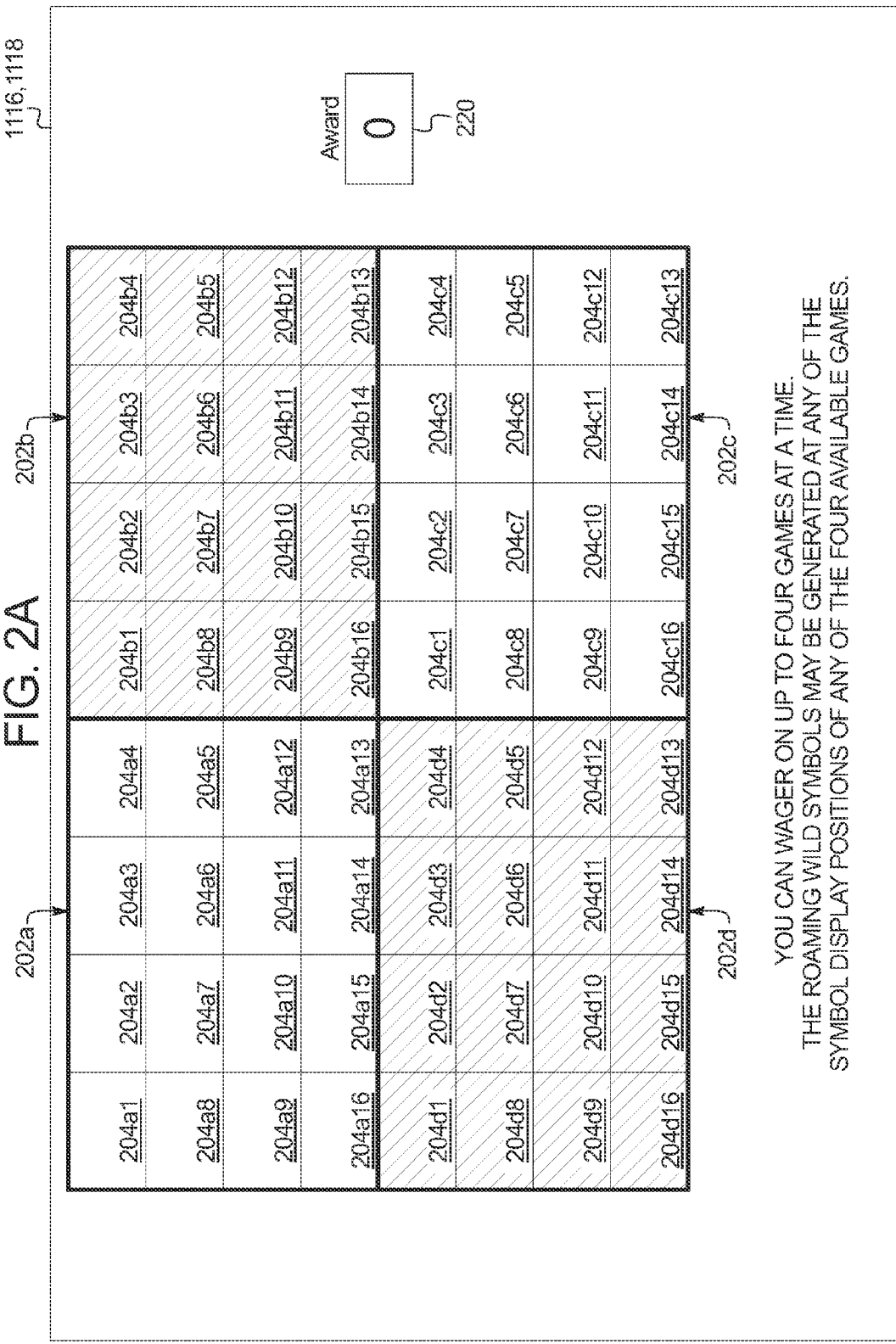

For example, as seen in FIG. 2A, the gaming system enables the player to wager on one or more of four games 202a, 202b, 202c and 202d. In this example, each game includes a distinct set or plurality of symbol display positions 204. Specifically, (i) a first available game 202a includes a first set of symbol display positions 204a1 to 204a16, (ii) a second available game 202b includes a second set of symbol display positions 204b1 to 204b16, (iii) a third available game 202c includes a third set of symbol display positions 204c1 to 204c16, and (iv) a fourth available game 202d includes a fourth set of symbol display positions 204d1 to 204d16. In this example, the gaming system provides appropriate messages such as "YOU CAN WAGER ON UP TO FOUR GAMES AT A TIME" and "THE ROAMING WILD SYMBOLS MAY BE GENERATED AT ANY OF THE SYMBOL DISPLAY POSITIONS OF ANY OF THE FOUR AVAILABLE GAMES" to the player visually, or through suitable audio or audiovisual displays.

After wagering on one or more of the plurality of games, the gaming system initiates each of the wagered on games such that the wagered on games are simultaneously played as indicated in block 104.

In one embodiment, the gaming system initiates and displays each of the plurality of wagered on games simultaneously, substantially simultaneously or overlappingly. In another embodiment, the gaming system initiates two or more of the plurality of wagered on games simultaneously or substantially simultaneously and initiates (but does not complete) two of more of the plurality of wagered on games sequentially or substantially sequentially. In another embodiment, the gaming system initiates (but does not complete) each of the plurality of wagered on games sequentially. It should be appreciated that regardless of if the gaming system initiates a plurality or each of the wagered on games at one time or at different times, the plays of the plurality of games overlap such that the gaming system provides the player a plurality of simultaneously played games. It should be appreciated that in one embodiment, each of the simultaneously, substantially simultaneously or overlappingly played games are separately and independently played.

For each initiated game, the gaming system generates and displays a plurality of symbols at the plurality of symbol display positions of that initiated game as indicated in block 106 of FIG. 1. For example, as seen in FIG. 2B, after the player wagered on games 202a and 202c, the gaming system simultaneously or overlappingly generated symbols 206 at: (i) the first set of symbol display positions 204a1 to 204a16 of the first available game, and (ii) the third set of symbol display positions 204c1 to 204c16 of the third available game. As also seen in FIG. 2B, since the player declined to wager on games 202b and 202d, the gaming system did not generate symbols at (i) the second set of symbol display positions 204b1 to 204b16 of the second available game, or (ii) the fourth set of symbol display positions 204d1 to 204d16 of the fourth available game. In this example, the gaming system provides appropriate messages such as "YOU WAGERED ON GAMES ONE AND THREE" and "ARE ANY OF THE GENERATED SYMBOLS FOR THESE TWO GAMES ASSOCIATED WITH ANY AWARDS?" to the player visually, or through suitable audio or audiovisual displays.

In addition to generating symbols at the symbol display positions for each initiated game, the gaming system generates and displays a plurality of roaming wild symbols at zero, one or more of the symbol display positions of the wagered on game(s) and/or zero, one or more of the symbol display positions of any non-wagered on game(s) as indicated in block 108.

It should be appreciated that while the gaming system generates symbols at the symbol display positions of the wagered on games (and does not generate symbols at the symbol display positions of any non-wagered on games), the gaming system generates roaming wild symbols at the symbol display positions of the games available to be wagered on, regardless of if the player wagered on one, more or each of such games. That is, for each play of at least one of the plurality of available games, each of the roaming wild symbols will be associated with a symbol display position of one of the plurality of games, wherein whether or not the player may benefit from a roaming wild symbol is based on whether that roaming wild symbol is randomly generated at: (i) a symbol display position of a wagered on played game, or (ii) a symbol display position of a non-wagered on, non-played game. Accordingly, the roaming wild symbols of these embodiments persist from game to game and move or roam from one symbol display position of one set of symbol display position to another symbol position (of the same set of symbol display positions or a different set of symbol display positions) as different games are played.

For example, as seen in FIG. 2C, in addition to generating symbols 206 at (i) the first set of symbol display positions 204a1 to 204a16 of the first available game, and (ii) the third set of symbol display positions 204c1 to 204c16 of the third available game, the gaming system generated: (i) roaming wild symbol 208a at symbol display position 204a12 of game 202a; (ii) roaming wild symbol 208b at symbol display position 204b6 of game 202b; (iii) roaming wild symbol 208c at symbol display position 204b10 of game 202b; (iv) roaming wild symbol 208d at symbol display position 204c6 of game 202c; (v) roaming wild symbol 208e at symbol display position 204c13 of game 202c; (vi) roaming wild symbol 208f at symbol display position 204d10 of game 202d; and (vii) roaming wild symbol 208g at symbol display position 204d16 of game 202d. In this example, the gaming system provides appropriate messages such as "THREE ROAMING WILD SYMBOLS MOVED TO THREE SYMBOL POSITIONS OF YOUR TWO PLAYED GAME" and "FOUR ROAMING WILD SYMBOLS MOVED TO FOUR SYMBOL POSITIONS OF THE TWO UNPLAYED GAMES" to the player visually, or through suitable audio or audiovisual displays.

In various embodiments, each generated roaming wild symbol functions as or otherwise changes to a different symbol, such as a symbol that causes a non-winning symbol combination to become a winning symbol combination. In one such embodiment, if the gaming system generates a roaming wild symbol at a symbol display position, the gaming system causes that wild symbol to function as a symbol that completes a winning symbol combination (e.g., the highest winning symbol combination) along one of the paylines. In another such embodiment, if the gaming system generates a roaming wild symbol at a symbol display position, the gaming system causes the wild symbol to substitute for one of the symbols indicated on the same payline as the wild symbol. In another such embodiment, if the gaming system generates a roaming wild symbol at a symbol display position, the gaming system causes the wild symbol to match or substitute for a designated symbol on a payline, such as a jackpot symbol or the symbol associated with the largest award in the game.

Following the generation of symbols at the symbol display positions of the wagered on games and the generation of roaming wild symbols at the symbol display positions of wagered on games and/or any non-wagered on games, the gaming system determines if, when accounting for any wild symbols generated at any symbol display positions, any of the generated symbols (or symbol combinations) are associated with any awards as indicated in diamond 110 of FIG. 1. That is, for each initiated game, the gaming system determines whether the generated symbols and any generated roaming wild symbols form any winning symbol combinations.

If the gaming system determines that at least one winning symbol combination is formed in at least one of the initiated game, for each initiated game that an award is associated with the generated symbols or symbol combinations, the gaming system displays the associated award and provides the associated award to the player as indicated in blocks 112 and 114. After providing any associated awards to the player (or after determining that none of the symbols or symbol combinations of the initiated games are associated with any awards), the gaming system returns to block 102 and, as described above, enables the player to place another plurality of wagers on the plurality of available games.

As seen in FIG. 2D, for initiated game 202a, the gaming system caused the generated roaming wild symbol 208a at symbol display position 204a12 to function as a cherry symbol to result in a winning symbol combination of cherry symbol-cherry symbol-cherry symbol-cherry symbol associated with an award of four-hundred credits. As also seen in FIG. 2D, for initiated game 202c, the gaming system caused the generated roaming wild symbol 208d at symbol display position 204c6 to function as a seven symbol to result in a winning symbol combination of seven symbol-seven symbol-seven symbol associated with an award of one-hundred credits. As further seen in FIG. 2D, for initiated game 202c, the gaming system caused the generated roaming wild symbol 208e at symbol display position 204c13 to function as an orange symbol to result in a winning symbol combination of orange symbol-orange symbol-orange symbol-orange symbol associated with an award of three-hundred credits. Accordingly, the gaming system provides an award of eight-hundred credits to the player (as indicated award meter 220). It should be appreciated that in this example, although the player utilized less than each of the generated roaming wild symbols (i.e., roaming wild symbols 208b, 208c, 208e and 208f were generated in non-played game and thus went unutilized), each of the generated roaming wild symbols utilized in a played game either changed a non-winning symbol combination into a winning symbol combination (i.e., roaming wild symbol 208d) or changed a winning symbol combination to a different winning symbol combination associated with a more lucrative award (i.e., roaming wild symbols 208a and 208e). In this example, the gaming system provides appropriate messages such as "THE ROAMING WILD SYMBOL FOR YOUR FIRST WAGERED ON GAME CHANGED YOUR CHERRY-CHERRY-CHERRY WINNING SYMBOL COMBINATION TO A MORE LUCRATIVE CHERRY-CHERRY-CHERRY-CHERRY WINNING SYMBOL COMBINATION ASSOCIATED WITH AN AWARD OF 400 CREDITS", "THE FIRST ROAMING WILD SYMBOL FOR YOUR SECOND WAGERED ON GAME CHANGED YOUR SEVEN-SEVEN-MONEY BAG LOSING SYMBOL COMBINATION TO A SEVEN-SEVEN-SEVEN WINNING SYMBOL COMBINATION ASSOCIATED WITH AN AWARD OF 100 CREDITS", "THE SECOND ROAMING WILD SYMBOL FOR YOUR SECOND WAGERED ON GAME CHANGED YOUR ORANGE-ORANGE-ORANGE WINNING SYMBOL COMBINATION TO A MORE LUCRATIVE ORANGE-ORANGE-ORANGE ORANGE WINNING SYMBOL COMBINATION ASSOCIATED WITH AN AWARD OF 300 CREDITS" and "YOUR TOTAL AWARD IS 800 CREDITS" to the player visually, or through suitable audio or audiovisual displays.

In one alternative embodiment, rather than the roaming wild symbols persisting from game to game (as described above), the gaming system generates one or more roaming wild symbols upon an occurrence of a roaming wild symbol generation event, such as an event independent of any displayed event associated with any of the available plurality of games. In this embodiment, upon the occurrence of a roaming wild symbol generation event, the gaming system generates such roaming wild symbols at zero, one or more of the symbol display positions of the wagered on game(s) and/or zero, one or more of the symbol display positions of any non-wagered on game(s). As described above, as such roaming wild symbols may be generated at the symbol display positions of both the played game(s) and any unplayed games, if the player wagers on each of the available games, the player is ensured to utilize each of any generated roaming wild symbols, and (ii) if the player wagers on less than each of the available games, the player is not ensured to utilize each of any generated roaming wild symbols.

Figure 3:
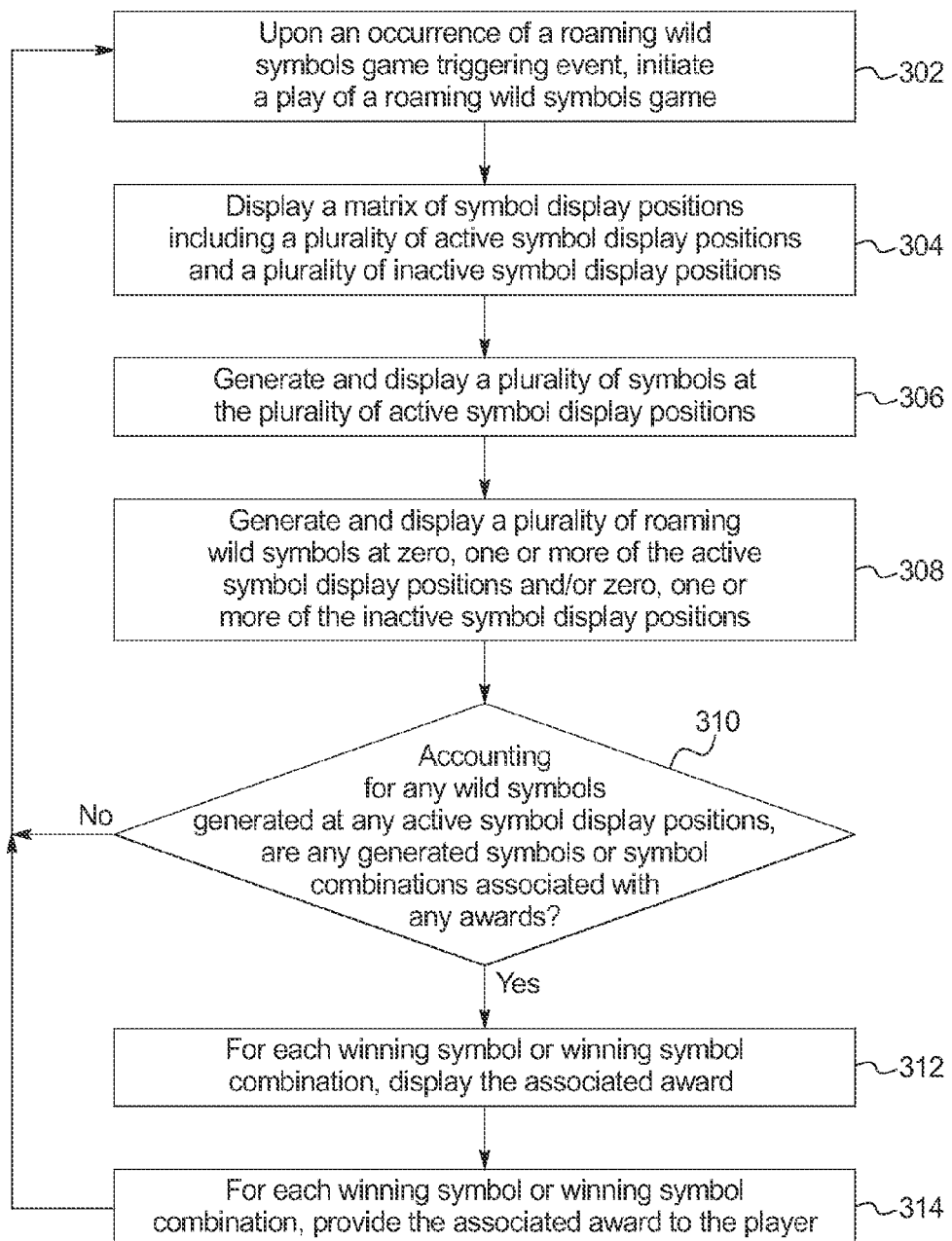
FIG. 3 is a flow chart an example process for operating a gaming system providing one embodiment of a game disclosed herein including active symbol display positions, inactive symbol display positions and one or more roaming wild symbols.

Referring now to FIG. 3, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 3, it should be appreciated that many other methods of performing the acts associated with this process may be used. For example, the order of certain steps described may be changed, or certain steps described may be optional.

In various embodiments, upon an occurrence of a roaming wild symbols game triggering event, as indicated in block 302 of FIG. 3, the gaming system initiates or triggers a play of a roaming wild symbols game. In one embodiment, the roaming wild symbols game is a secondary or bonus game wherein a roaming wild symbols game triggering event occurs based on a displayed event associated with a wagered on play of a primary game. In another embodiment wherein the roaming wild symbols game is a secondary or bonus game, a roaming wild symbols game triggering event occurs based on an event independent of any displayed event associated with a wagered on play of a primary game. In another embodiment, the roaming wild symbols game is a primary game wherein a roaming wild symbols game triggering event occurs upon a player placing a wager to play the roaming wild symbols game.

For this initiated roaming wild symbols game, the gaming system displays a matrix or configuration of symbol display positions including a plurality of active symbol display positions and a plurality of inactive symbol display positions as indicated in block 304. In one such embodiment, this roaming wild symbols game includes a distinct plurality or set of reels which is associated with or otherwise corresponds to the plurality of active symbol display positions.

For example, as seen in FIG. 4A, upon the occurrence of a roaming wild symbol game triggering event, the gaming system displays a matrix of symbol display positions 402 including a plurality the active symbol display position 404a to 404o and a plurality of inactive symbol display positions 406a to 406hh. In this example, the gaming system provides appropriate messages such as "WHILE SYMBOLS WILL BE GENERATED AT THE ACTIVE SYMBOL DISPLAY POSITIONS, ROAMING WILD SYMBOLS MAY BE GENERATED AT EITHER ACTIVE SYMBOL DISPLAY POSITIONS OR INACTIVE SYMBOL DISPLAY POSITIONS" and "GOOD LUCK" to the player visually, or through suitable audio or audiovisual displays.

Following the display of the symbol display positions, the gaming system generates and displays a plurality of symbols at the plurality of active symbol display positions as indicated in block 306 of FIG. 3. For example, as seen in FIG. 4B, for the initiated roaming wild symbols game, the gaming system generated symbols 408 at each of the active symbol display positions 404a to 404o. In this example, the gaming system provides appropriate messages such as "ARE ANY OF THE SYMBOLS OR SYMBOL COMBINATIONS GENERATED AT ANY OF THE ACTIVE SYMBOL DISPLAY POSITIONS ASSOCIATED WITH ANY AWARDS?" to the player visually, or through suitable audio or audiovisual displays.

In addition to generating symbols at the active symbol display positions, the gaming system generates and displays a plurality of roaming wild symbols at zero, one or more of the active symbol display positions and/or zero, one or more of the inactive symbol display positions as indicated in block 308.

It should be appreciated that while the gaming system generates symbols at the active symbol display positions (and does not generate symbols at the inactive symbol display positions), the gaming system generates roaming wild symbols at any of the symbol display positions of the symbol matrix, regardless of if that symbol display position is an active symbol display position or an inactive symbol display position. That is, for each play of this roaming wild symbols game, each of the roaming wild symbols will be associated with a symbol display position, wherein whether or not the player may benefit from a roaming wild symbol is based on whether that roaming wild symbol is randomly generated at: (i) an active symbol display position, or (ii) an inactive symbol display position. Accordingly, the roaming wild symbols of these embodiments persist from game to game and as different games are played, one or more of such roaming wild symbols move or roam from: (i) active symbol display positions to inactive symbol display positions; (ii) inactive symbol display positions to active symbol display positions; (iii) active symbol display positions to active symbol display positions; and/or (iv) inactive symbol display positions to inactive symbol display positions.

For example, as seen in FIG. 4C, in addition to generating symbols 406 at the active symbol display positions 404a to 404o, the gaming system generated: (i) roaming wild symbol 410a at inactive symbol display position 406d; (ii) roaming wild symbol 410b at active symbol display position 404b; (iii) roaming wild symbol 410c at active symbol display position 404f; (iv) roaming wild symbol 410d at active symbol display position 404j; and (v) roaming wild symbol 410e at inactive symbol display position 406gg. In this example, the gaming system provides appropriate messages such as "THREE ROAMING WILD SYMBOLS MOVED TO THREE ACTIVE SYMBOL POSITIONS" and "TWO ROAMING WILD SYMBOLS MOVED TO INACTIVE SYMBOL POSITIONS" to the player visually, or through suitable audio or audiovisual displays.

Following the generation of symbols at the active symbol display positions and the generation of roaming wild symbols at the active symbol display positions and/or the inactive symbol display positions, the gaming system determines if, when accounting for any wild symbols generated at any active symbol display positions, any of the generated symbols (or symbol combinations) are associated with any awards as indicated in diamond 310 of FIG. 3. That is, the gaming system determines whether the symbols at the symbol display positions and any roaming wild symbols generated at any active symbol display positions form any winning symbol combinations.

If the gaming system determines that at least one winning symbol combination is formed, for each winning symbol or winning symbol combination, the gaming system displays the associated award and provides the associated award to the player as indicated in blocks 312 and 314. After providing any associated awards to the player (or after determining that none of the symbols or symbol combinations are associated with any awards), the gaming system returns to block 302 and, as described above, awaits another occurrence of a roaming wild symbols game triggering event.

As seen in FIG. 4D, the gaming system caused the generated roaming wild symbol 410b at active symbol display position 404b to function as a cherry symbol to result in a winning symbol combination of cherry symbol-cherry symbol-cherry symbol associated with an award of two-hundred credits. As also seen in FIG. 4D, the gaming system caused the generated roaming wild symbol 410d at active symbol display position 404j to function as a seven symbol to result in a winning symbol combination of seven symbol-seven symbol-seven symbol associated with an award of one-hundred credits. As further seen in FIG. 4D, roaming wild symbol 410c generated at symbol display position 404f did not cause any non-winning symbol combination to transform into a winning combination. Accordingly, the gaming system provides an award of three-hundred credits to the player (as indicated award meter 420). It should be appreciated that in this example, although the player utilized less than each of the generated roaming wild symbols (i.e., roaming wild symbols 410a and 410e were generated at inactive symbol display positions and thus went unutilized), certain of the roaming wild symbols generated at active symbol display positions changed a non-winning symbol combination into a winning symbol combination (i.e., roaming wild symbols 410b and 410d). In this example, the gaming system provides appropriate messages such as "ONE ROAMING WILD SYMBOL CHANGED YOUR CHERRY-BELL-CHERRY LOSING SYMBOL COMBINATION TO A CHERRY-CHERRY-CHERRY WINNING SYMBOL COMBINATION ASSOCIATED WITH AN AWARD OF 200 CREDITS", "ANOTHER ROAMING WILD SYMBOL CHANGED YOUR BAR-SEVEN-SEVEN LOSING SYMBOL COMBINATION TO A SEVEN-SEVEN-SEVEN WINNING SYMBOL COMBINATION ASSOCIATED WITH AN AWARD OF 100 CREDITS", and "YOUR TOTAL AWARD IS 300 CREDITS" to the player visually, or through suitable audio or audiovisual displays.

In one alternative embodiment, rather than the roaming wild symbols persisting from game to game (as described above), the gaming system generates one or more roaming wild symbols upon an occurrence of a roaming wild symbol generation event, such as an event independent of any displayed event associated with any of the available plurality of games. In this embodiment, upon the occurrence of a roaming wild symbol generation event, the gaming system generates such roaming wild symbols at zero, one or more of the active symbol display positions and/or zero, one or more of the inactive symbol display positions. As described above, as such roaming wild symbols may be generated at any of the symbol display positions, the determination of whether or not the player benefits from such roaming wild symbols is based, at least in part, on whether such roaming wild symbols are generated at active symbol display positions (as opposed to inactive symbol display positions).

In another embodiment, the gaming system utilizes roaming wild symbols if such roaming wild symbols are generated at active symbol display positions or designated inactive symbol display positions. In one such embodiment, one or more inactive symbol display positions adjacent to one or more active symbol display positions are designated inactive symbol display positions. It should be appreciated that such use of roaming wild symbols at otherwise inactive symbol display positions enables the gaming system to form winning symbol combinations with additional quantities of symbols and thus enables the gaming system to provide more lucrative awards to players. For example, a roaming wild symbol positioned at a designated inactive symbol display position may cause a five symbol winning symbol combination associated with a first award to become a six symbol winning symbol combination associated with a second, greater award.

In another embodiment employing roaming wild symbols, if a plurality of roaming wild symbols are generated at the same symbol display position, the gaming system triggers or activates one or more features. In one embodiment, if a plurality of roaming wild symbols are generated at the same symbol display position, the gaming system causes the roaming wild symbols to function as a wild modifier symbol, such as a wild multiplier symbol. In one such embodiment, if a plurality of roaming wild symbols are generated at or otherwise converge onto a symbol display position of a wagered on, simultaneously or overlapping played game (as described above), the gaming system causes such multiple roaming wild symbols to function as a wild symbol wherein any award associated with any winning symbol combination including those roaming wild symbols is modified by a modifier, such as a multiplier. In one such embodiment, if a plurality of roaming wild symbols are generated at or otherwise converge onto an active symbol display position (as described above), the gaming system causes such multiple roaming wild symbols to function as a wild symbol wherein any award associated with any winning symbol combination including those roaming wild symbols is modified by a modifier, such as a multiplier. In this embodiment, the greater the quantity of roaming wild symbols that converge onto a single symbol display position, the greater the modifier utilized to modify any awards associated with any winning symbol combination including those roaming wild symbols.

In another embodiment employing roaming wild symbols, if a plurality of roaming wild symbols are generated at associated symbol display positions, the gaming system triggers or activates one or more features. In one embodiment, if a plurality of roaming wild symbols are generated at associated symbol display positions (either associated with a single game or a plurality of simultaneously played games), the gaming system causes the roaming wild symbols to function as a wild modifier symbol, such as a wild multiplier symbol.

In another embodiment employing roaming wild symbols, if a plurality of roaming wild symbols are generated at adjacent symbol display positions, the gaming system triggers or activates one or more features. In one embodiment, if a plurality of roaming wild symbols are generated at adjacent symbol display positions, the gaming system causes the roaming wild symbols to function as a wild modifier symbol, such as a wild multiplier symbol. In one such embodiment, if a plurality of roaming wild symbols are generated at adjacent symbol display positions of a wagered on, simultaneously or overlapping played game (as described above), the gaming system causes such multiple roaming wild symbols to function as a wild symbol wherein any award associated with any winning symbol combination including those roaming wild symbols is modified by a modifier, such as a multiplier. In one such embodiment, if a plurality of roaming wild symbols are generated at adjacent active symbol display position (as described above), the gaming system causes such multiple roaming wild symbols to function as a wild symbol wherein any award associated with any winning symbol combination including those roaming wild symbols is modified by a modifier, such as a multiplier. In these embodiment, the greater the quantity of roaming wild symbols generated at adjacent symbol display positions, the greater the modifier utilized to modify any awards associated with any winning symbol combination including those roaming wild symbols.

As seen in FIG. 5, in one example employing such designated inactive symbol display positions, while the gaming system generated roaming wild symbols 510c and 510d at inactive symbol display positions 506k and 506r, respectively, since these inactive symbol display positions are adjacent to active symbol display positions 504c and 504j, respectively, the gaming system classifies such inactive symbol display positions as designated inactive symbol display positions. Accordingly, the gaming system of this example enables such generated roaming wild symbols to be utilized to form one or more winning symbol combinations. In this example, the gaming system provides appropriate messages such as "ALTHOUGH FOUR ROAMING WILD SYMBOLS WERE GENERATED AT INACTIVE SYMBOL DISPLAY POSITIONS, TWO OF THESE ROAMING WILD SYMBOLS WERE GENERATED AT INACTIVE SYMBOL DISPLAY POSITIONS CLOSE ENOUGH TO THE SET OF ACTIVE SYMBOL DISPLAY POSITIONS TO TRANSFORM THESE TWO INACTIVE SYMBOL DISPLAY POSITIONS TO ACTIVE SYMBOL DISPLAY POSITIONS" to the player visually, or through suitable audio or audiovisual displays.

In another embodiment employing active symbol display positions and inactive symbol display positions, the gaming system enables a player to place a plurality of wagers on a plurality of available games. In this embodiment, the symbol display positions of each wagered on game are active symbol display positions, wherein the inactive symbol display positions are formed from the symbol display positions of each non-wagered on game and the otherwise inactive symbol display positions of the symbol display position matrix. That is, in this embodiment, in addition to having one or more predetermined inactive symbol display positions, the gaming system classifies the symbol display positions of each non-wagered on game as inactive symbol display positions.

In this embodiment, after wagering on one or more of the plurality of games, the gaming system initiates each of the wagered on games such that the wagered on games are simultaneously played as described above.

Figure 6A:
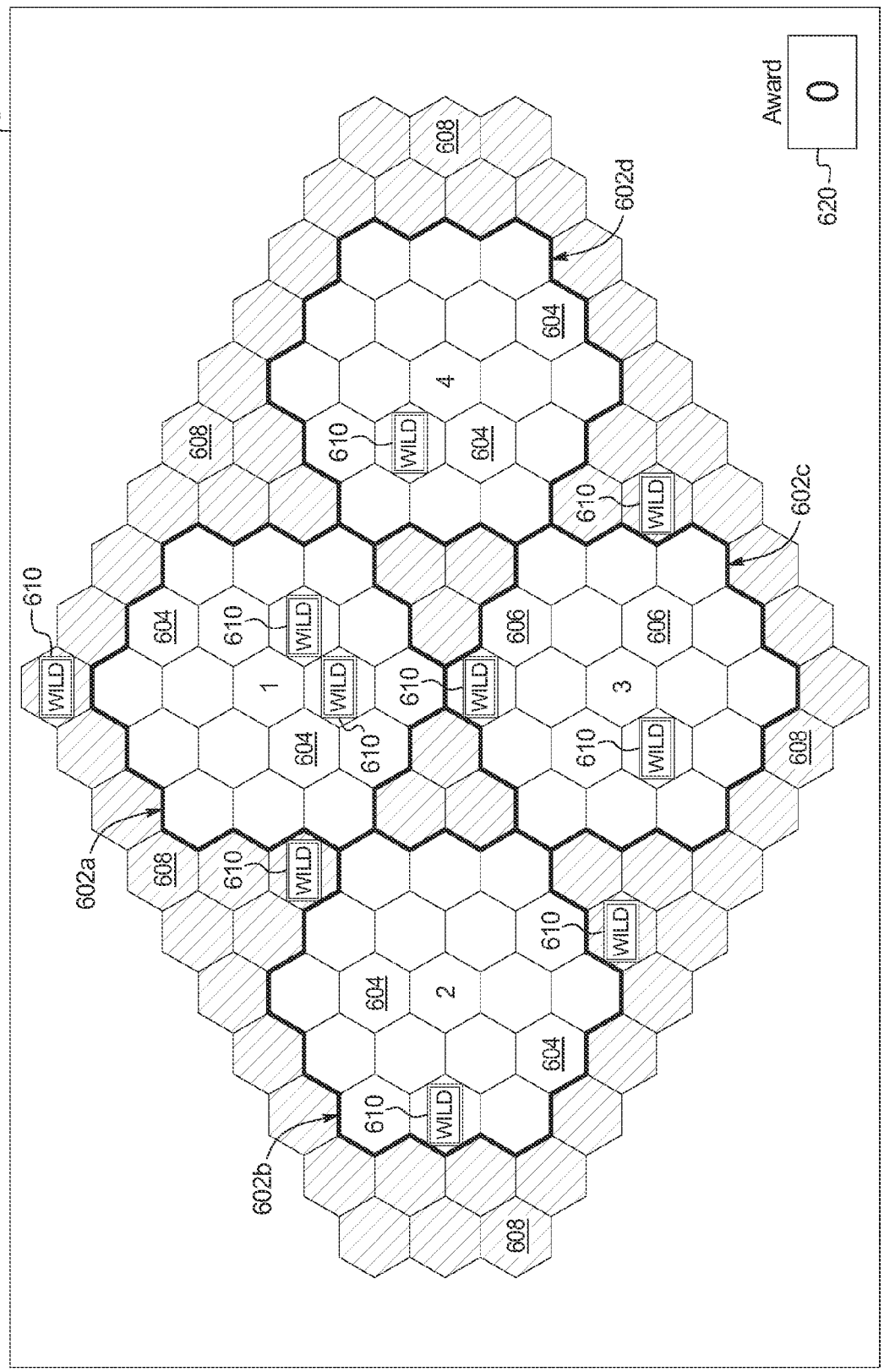
FIG. 6A is a front view of one embodiment of the gaming system disclosed herein illustrating an example of a plurality of simultaneously or overlappingly played games with active symbol display positions, inactive symbol display positions and one or more roaming wild symbols.

In addition to generating symbols at the symbol display positions for each initiated game, the gaming system of this embodiment generates and displays a plurality of roaming wild symbols at: (i) zero, one or more of the active symbol display positions of the wagered on game(s), (ii) zero, one or more of the inactive symbol display positions of any non-wagered on game(s), and/or (iii) zero, one or more of the inactive symbol display positions which are separate from the inactive symbol display positions of any non-wagered on game(s). Put differently, while the gaming system generates symbols at the symbol display positions of the wagered on games (i.e., the active symbol display positions of this embodiment), the gaming system generates roaming wild symbols at: (i) the active and inactive symbol display positions of the games available to be wagered on, and (ii) the inactive symbol display positions separate and distinct from the symbol display positions of any games available to be wagered on. That is, for each play of at least one of the plurality of available games, each of the roaming wild symbols will be associated with: (i) a symbol display position of one of the plurality of games, or (ii) an inactive symbol display position distinct from any of the symbol display positions of any of the plurality of games, wherein whether or not the player may benefit from a roaming wild symbol is based on whether that roaming wild symbol is randomly generated at: (i) an active symbol display position of a wagered on played game, (ii) an inactive symbol display position of a non-wagered on, non-played game, or (iii) an inactive symbol display position separate from any of the games. For example, as seen in FIG. 6A, the gaming system includes four games 602a, 602b, 602c and 602d available to wager on wherein the player of this example wagered on games 602a, 602b and 602d. Based on the wagered on games, the gaming system determined that the distinct set or plurality of symbol display positions of games 602a, 602b and 602d are active symbol display positions 604. Based on the player electing not to wager on game 602c, the gaming system determined that the distinct set or plurality of symbol display positions of game 602c are inactive symbol display positions 606. As further seen in FIG. 6A, the matrix of symbol display positions of this embodiment includes a plurality of predetermined inactive symbol display positions 608 and a plurality of roaming wild symbols 610.

In another embodiment employing simultaneously or overlappingly played games and inactive symbol display positions, if the gaming system generates a roaming wild symbol at an inactive symbol display position that is adjacent the set of active symbol display positions of two wagered on games, the gaming system connects or links the two wagered on games. That is, the gaming system of this embodiment utilizes roaming wild symbols to bridge the symbols of two wagered on games such that the gaming system evaluates the generated symbols from two wagered on games to determine if a winning symbol combination is formed. For example, as seen in FIG. 6B, the highlighted roaming wild symbol 610 connects the active symbol display positions of wagered on game 602a to the active symbol display positions of wagered on game 602c. Such a configuration provides that in this example, the gaming system evaluates: (i) one or more symbols generated in one or more active symbol display positions of wagered on game 602a, and (ii) one or more symbols generated in one or more active symbol display positions of wagered on game 602c, to determine if such generated symbols form any winning symbol combinations.

In another embodiment, the gaming system randomly generates one or more symbols at one or more inactive symbol display positions wherein if the gaming system generates a roaming wild symbol at an inactive symbol display position that is adjacent the generated symbols of two symbol display positions (regardless of whether such symbols are generated at active symbol display positions or inactive symbol display positions), the gaming system connects or links the symbol display positions to determine if such generated symbols form any winning symbol combinations.

Figure 6C:
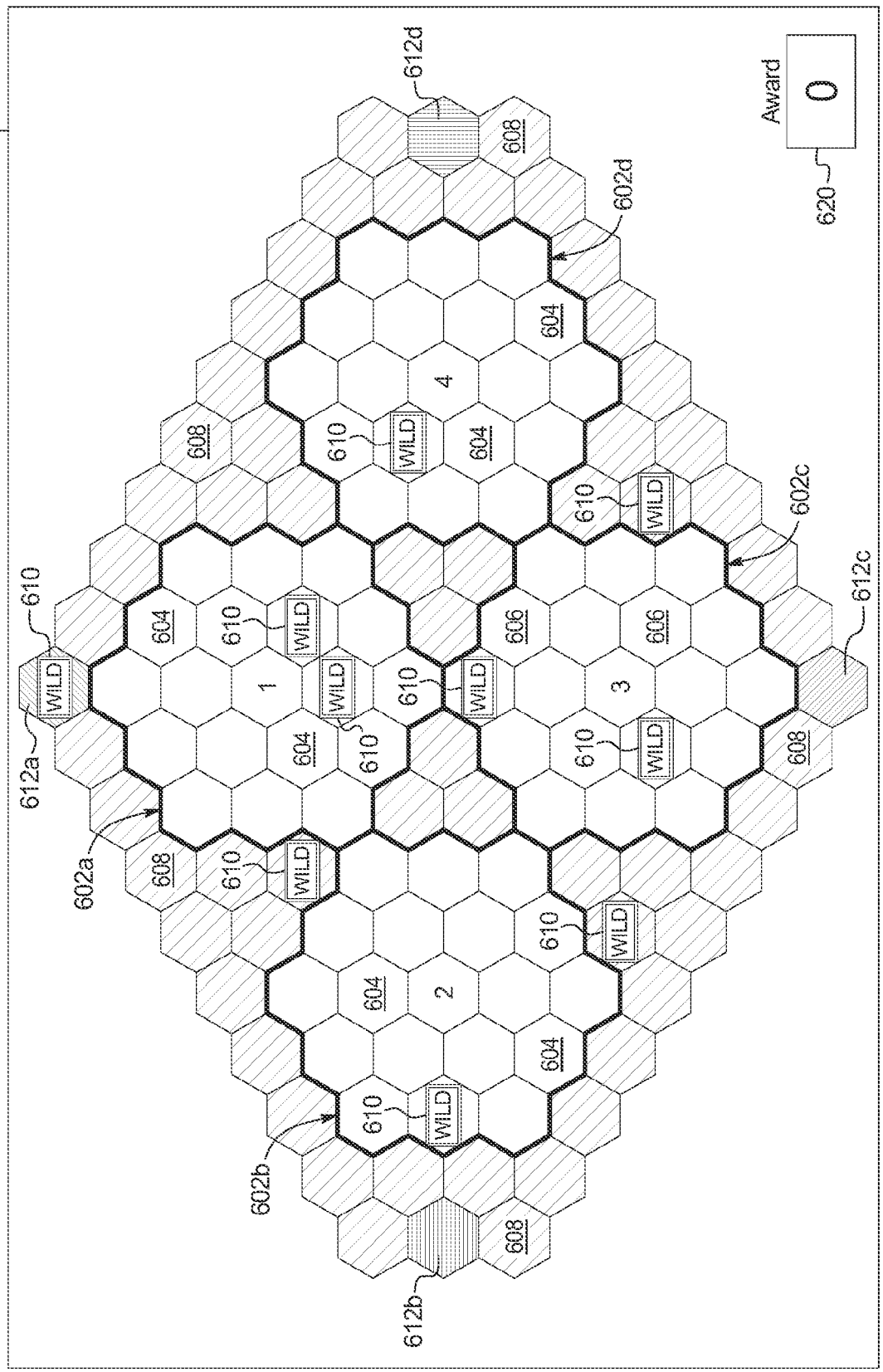
FIG. 6C is a front view of one embodiment of the gaming system disclosed herein illustrating an example of a plurality of simultaneously or overlappingly played games with active symbol display positions, inactive symbol display positions, one or more roaming wild symbols and one or more triggering symbol display positions.

In another embodiment employing roaming wild symbols, one or more symbol display positions are trigger symbol display positions associated with one or more features. In this embodiment, if the gaming system generates a roaming wild symbol at a trigger symbol display position, the gaming system triggers one or more features, such as a win multiplier, a bonus trigger, an award of credits and/or a symbol expansion. In different embodiments, different trigger symbol display positions are associated with different features. In one such embodiment, if the gaming system generates a plurality of roaming wild symbols at a plurality of trigger symbol display positions, the gaming system triggers different features. For example, if the gaming system generates roaming wild symbols at trigger symbol display positions associated with a win multiplier and a bonus game trigger, the gaming system triggers a free spin bonus game utilizing a higher multiplier than the win multiplier associated with one of the designated symbol display positions. For example, as seen in FIG. 6C, the gaming system includes four designated symbol display positions 612a, 612c, 612c and 612d wherein if the gaming system generates any roaming wild symbol at such trigger symbol display positions the gaming system triggers the corresponding feature.

In another embodiment, the gaming system additionally or alternatively employs the symbols generated at the symbol display positions to trigger such features. In this embodiment, if the gaming system generates a roaming wild symbol at the same symbol display position which the gaming system generated a trigger or designated symbol, the gaming system triggers a feature associated with the trigger or designated symbol. For example, if the gaming system generates a power button symbol at the same symbol display position which the gaming system generates a roaming wild symbol, the gaming system triggers a bonus event.

In another embodiment, rather than employing roaming wild symbols, the gaming system randomly generates locked wild symbols at one or more symbol display positions. In one embodiment, if a plurality of locked wild symbols are generated at the same symbol display position, the gaming system triggers or activates one or more features, such as causing the locked wild symbols to function as a wild modifier symbol, wherein any award associated with any winning symbol combination including those locked wild symbols is modified by a modifier, such as a multiplier. In one such embodiment, the greater the quantity of locked wild symbols that converge onto a single symbol display position, the greater the modifier utilized to modify any awards associated with any winning symbol combination including those locked wild symbols.

In another embodiment, rather than employing roaming wild symbols, the gaming system randomly generates locked wild symbols at one or more symbol display positions. In one embodiment, if a plurality of locked wild symbols are generated at adjacent symbol display positions, the gaming system triggers or activates one or more features, such as causing the locked wild symbols to function as a wild modifier symbol, wherein any award associated with any winning symbol combination including those locked wild symbols is modified by a modifier, such as a multiplier. In these embodiment, the greater the quantity of locked wild symbols generated at adjacent symbol display positions, the greater the modifier utilized to modify any awards associated with any winning symbol combination including those locked wild symbols.

In one embodiment, the gaming system provides a group gaming aspect to the roaming wild symbols game disclosed herein. In one such embodiment, the roaming wild symbols game is a cooperative community game wherein a plurality of players cooperate or play together to win one or more awards. In another such embodiment, the roaming wild symbols game is a competition community game wherein a plurality of players compete or player against each other to win one or more awards.

In different embodiments, if, as described above, one or more features are triggered based, at least in part, on the generation of one or more roaming wild symbols, the gaming system selects such feature(s) from the group of features including, but not limited to:
  (i) a book-end wild symbols feature;
  (ii) a stacked wild symbols feature;
  (iii) an expanding wild symbols feature;
  (iv) a wild reel feature;
  (v) a retrigger symbol feature;
  (vi) an anti-terminator symbol feature;
  (vii) locking reel feature,
  (viii) a locking symbol position feature;
  (ix) a modification of an amount of credits of a credit balance;
  (x) a modification of an amount of promotional credits;
  (xi) a modification of a placed wager amount;
  (xii) a modification of a wager amount available to be placed;
  (xiii) a modification of a placed side wager amount;
  (xiv) a modification of a side wager amount available to be placed;
  (xv) a modification of a number of wagered on paylines;
  (xvi) a modification of a number of paylines available to be wagered on;
  (xvii) a modification of a wager placed on one or more paylines (or on one or more designated paylines);
  (xviii) a modification of a number of ways to win wagered on;
  (xix) a modification of a number of available ways to win to be wagered on;
  (xx) a modification of a wager placed on one or more ways to win (or on one or more designated ways to win);

(xxi) a modification of a paytable utilized for a play of a game;
(xxii) a modification of an average expected payback percentage of a play of a game;
(xxiii) a modification of one or more awards available;
(xxiv) a modification of a range of awards available;
(xxv) a modification of a type of awards available;
(xxvi) a modification of one or more progressive awards;
(xxvii) a modification of one or more modifiers, such as multipliers, available;
(xxviii) a modification of an activation of a reel (or a designated reel);
(xxix) a modification of an activation of a plurality of reels;
(xxx) a modification of a generated outcome (or a designated generated outcome);
(xxxi) a modification of a generated outcome (or a designated generated outcome) associated with an award over a designated value;
(xxxii) a modification of a generated outcome (or a designated generated outcome) on a designated payline;
(xxxiii) a modification of a generated outcome (or a designated generated outcome) in a scatter configuration;
(xxxiv) a modification of a winning way to win (or a designated winning way to win);
(xxxv) a modification of a designated symbol or symbol combination;
(xxxvi) a modification of a generation of a designated symbol or symbol combination on a designated payline;
(xxxvii) a modification of a generation of a designated symbol or symbol combination in a scatter configuration;
(xxxviii) a modification of a triggering event of a play of a secondary or bonus game;
(xxxix) a modification of an activation of a secondary or bonus display (such as an award generator);
(xl) a modification of an activation of a community award generator;
(xli) a modification of a generated outcome (or a designated generated outcome) in a secondary game;
(xlii) a modification of an amount of free spins provided;
(xliii) a modification of a game terminating or ending condition;
(xliv) a modification of how one or more aspects of one or more games (e.g., colors, speeds, sound) are displayed to a player;
(xlv) a modification of any game play feature associated with any play of any game disclosed herein;
(xlvi) a play of any suitable slot game;
(xlvii) a play of any suitable free spins or free game activations;
(xlviii) a play of any suitable wheel game;
(xlix) a play of any suitable card game;
(l) a play of any suitable offer and acceptance game;
(li) a play of any suitable award ladder game;
(lii) a play of any suitable puzzle-type game;
(liii) a play of any suitable persistence game;
(liv) a play of any suitable selection game;
(lv) a play of any suitable cascading symbols game;
(lvi) a play of any suitable ways to win game;
(lvii) a play of any suitable scatter pay game;
(lviii) a play of any suitable coin-pusher game;
(lix) a play of any suitable elimination game;
(lx) a play of any suitable stacked wilds game;
(lxi) a play of any suitable trail game;
(lxii) a play of any suitable bingo game;
(lxiii) a play of any suitable video scratch-off game;
(lxiv) a play of any suitable pick-until-complete game;
(lxv) a play of any suitable shooting simulation game;
(lxvi) a play of any suitable racing game;
(lxvii) a play of any suitable promotional game;
(lxviii) a play of any suitable high-low game;
(lxix) a play of any suitable lottery game;
(lxx) a play of any suitable number selection game;
(lxxi) a play of any suitable dice game;
(lxxii) a play of any suitable skill game;
(lxxiii) a play of any suitable auction game;
(lxxiv) a play of any suitable reverse-auction game;
(lxxv) a play of any suitable group game; and/or
(lxxvi) a play of any other suitable type of game.

In one embodiment, the gaming system causes at least one display device of the player's gaming device to display the roaming wild symbols game. In another embodiment, in addition or in alternative to each gaming device displaying the roaming wild symbols game, the gaming system causes one or more community or overhead display devices to display part or all of the roaming wild symbols game to one or more other players or bystanders either at a gaming establishment or viewing over a network, such as the internet. In another embodiment, in addition or in alternative to each gaming device displaying the roaming wild symbols game, the gaming system causes one or more internet sites to each display the roaming wild symbols game such that a player is enabled to log on from a personal web browser. In another such embodiment, the gaming system enables the player to play one or more primary games on one device while viewing the roaming wild symbols game from another device. For example, the gaming system enables the player to play one or more primary games on a mobile phone while viewing the status of the roaming wild symbols game on a desktop or laptop computer.

In another embodiment, as mentioned above, a roaming wild symbols game triggering event and/or a roaming wild symbol generation event occurs, based on an outcome associated with one or more plays of any primary game and/or an outcome associated with one or more plays of any secondary game of the gaming devices in the gaming system. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a roaming wild symbols game triggering event and/or a roaming wild symbol generation event to occur.

In another embodiment, as also mentioned above, the gaming system does not provide any apparent reasons to the players for a roaming wild symbols game triggering event and/or a roaming wild symbol generation event to occur. In these embodiments, such determinations are not triggered by an event in a primary game or based specifically on any of the plays of any primary game or on any of the plays of any secondary game of the gaming devices in the system. That is, these events occur without any explanation or alternatively with simple explanations.

In one embodiment, a roaming wild symbols game triggering event and/or a roaming wild symbol generation event occurs, based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a roaming wild symbols game triggering event and/or a roaming wild symbol generation event occurs, based on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a roaming wild symbols game triggering event and/or a roaming wild symbol generation event occurs, based on a predefined variable reaching a defined parameter threshold. For example, when the 500,000$^{th}$ player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another alternative embodiment, a roaming wild symbols game triggering event and/or a roaming wild symbol generation event occurs, based on a quantity of games played. In this embodiment, a quantity of games played is set for when one or more of such events or conditions will occur. In one embodiment, such a set quantity of games played is based on historic data.

In another alternative embodiment, a roaming wild symbols game triggering event and/or a roaming wild symbol generation event occurs, based on time. In this embodiment, a time is set for when one or more of such events or conditions will occur. In one embodiment, such a set time is based on historic data.

In another alternative embodiment, a roaming wild symbols game triggering event and/or a roaming wild symbol generation event occurs, based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, a roaming wild symbols game triggering event and/or a roaming wild symbol generation event occurs, based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another alternative embodiment, a roaming wild symbols game triggering event and/or a roaming wild symbol generation event occurs, based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a roaming wild symbols game triggering event and/or a roaming wild symbol generation event to occur may be implemented in accordance with the gaming system and method disclosed herein.

It should be appreciated that any of the above-described roaming wild symbols game triggering events and/or a roaming wild symbol generation events may be combined in one or more different embodiments.

Alternative Embodiments

It should be appreciated that in different embodiments, one or more of:
  i. a quantity of roaming wild symbols generated when at least one game is initiated;
  ii. which symbol display positions which roaming wild symbols are generated at;

iii. which function(s) each roaming wild symbol will employ;
iv. a quantity of games simultaneously or overlappingly wagered on;
v. a quantity of symbol display positions associated with each game played;
vi. a quantity of active symbol display positions associated with each game played;
vii. a quantity of inactive symbol display positions associated with each game played;
viii. a quantity of active symbol display positions of a symbol display matrix;
ix. a quantity of inactive symbol display positions of a symbol display matrix;
x. which symbols are generated at which symbol display positions;
xi. a quantity of roaming wild symbols generated at active symbol display positions;
xii. a quantity of roaming wild symbols generated at inactive symbol display positions;
xiii. a quantity of roaming wild symbols generated at symbol display positions of wagered on games;
xiv. a quantity of roaming wild symbols generated at symbol display positions of non-wagered on games;
xv. a quantity of trigger symbol display positions;
xvi. which symbol positions are classified as trigger symbol display positions;
xvii. which features are associated with which trigger symbol display positions;
xviii. a quantity of designated inactive symbol display positions;
xix. which symbol positions are classified as designated inactive symbol display positions;
xx. which features are employed if a plurality of roaming wild symbols converge on a single symbol display position;
xxi. which features are employed if a plurality of roaming wild symbols converge on associated symbol display positions;
xxii. which symbol combinations form winning symbol combinations;
xxiii. which awards are associated with which formed winning symbol combinations; and
xxiv. any determination disclosed herein;
is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 7A:
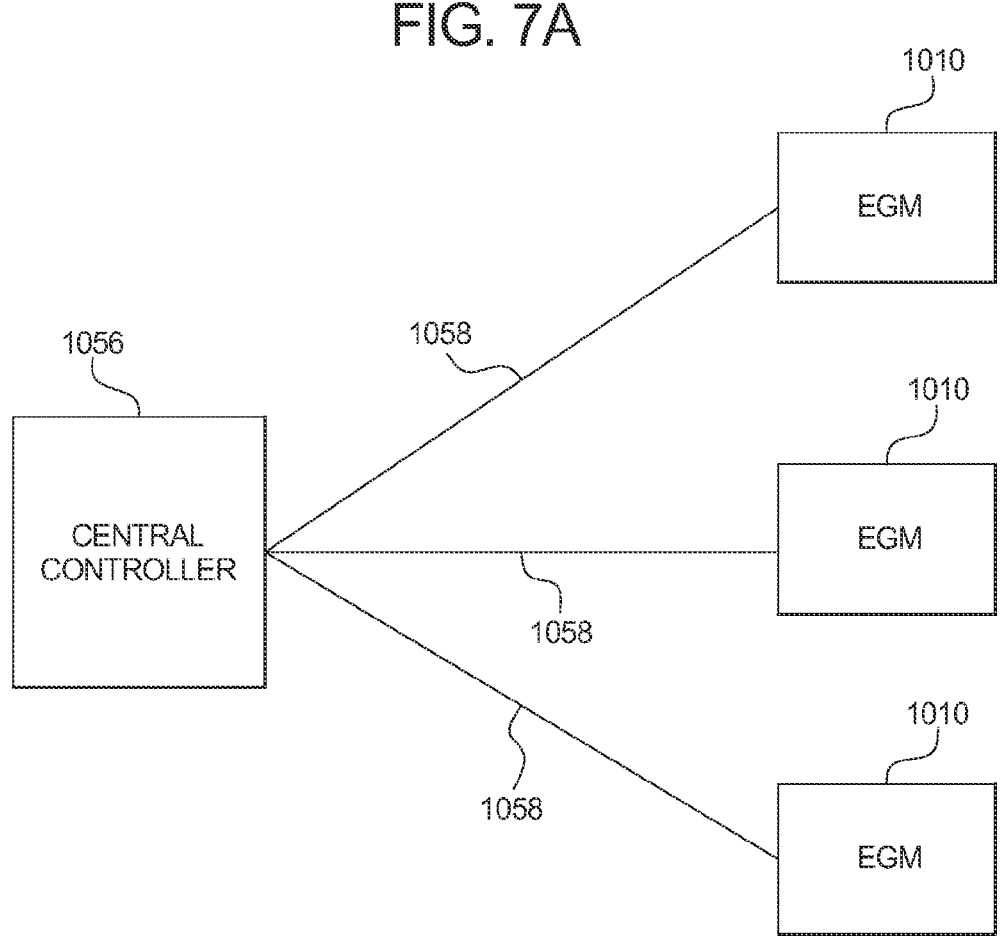
FIG. 7A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 7A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 7B:
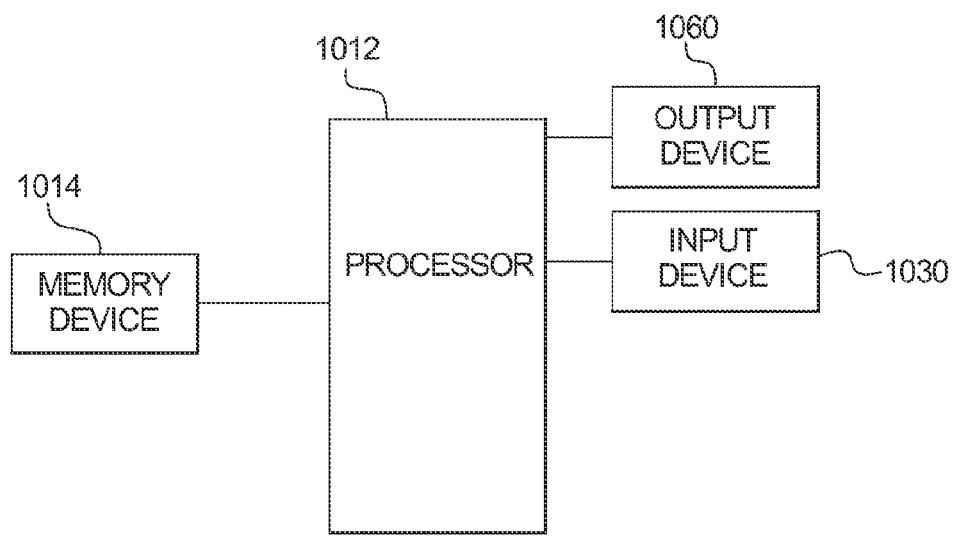
FIG. 7B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 7B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 7B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 8A:
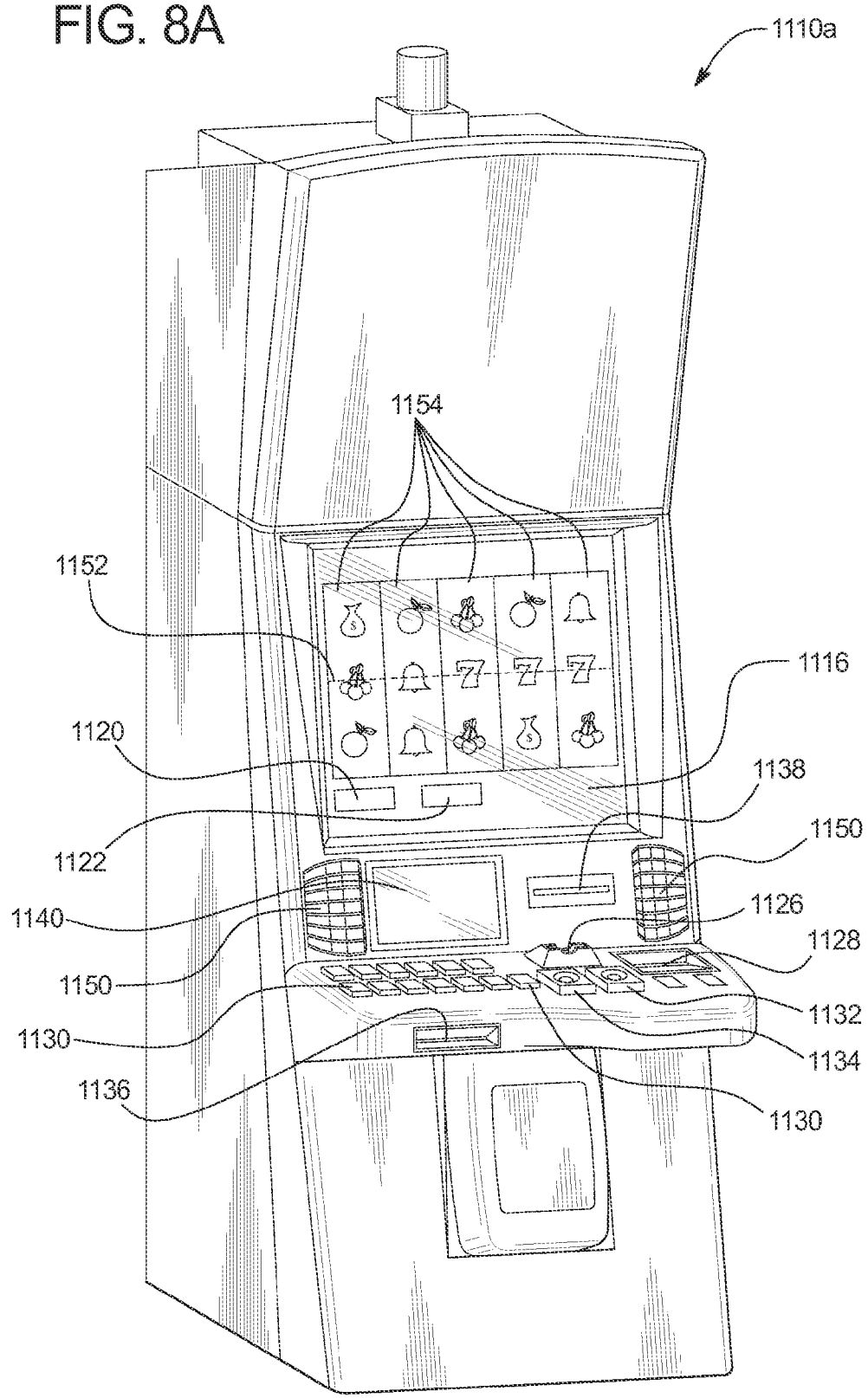
FIGS. 8A and 8B are perspective views of example alternative embodiments of the gaming system disclosed herein.
Figure 8B:
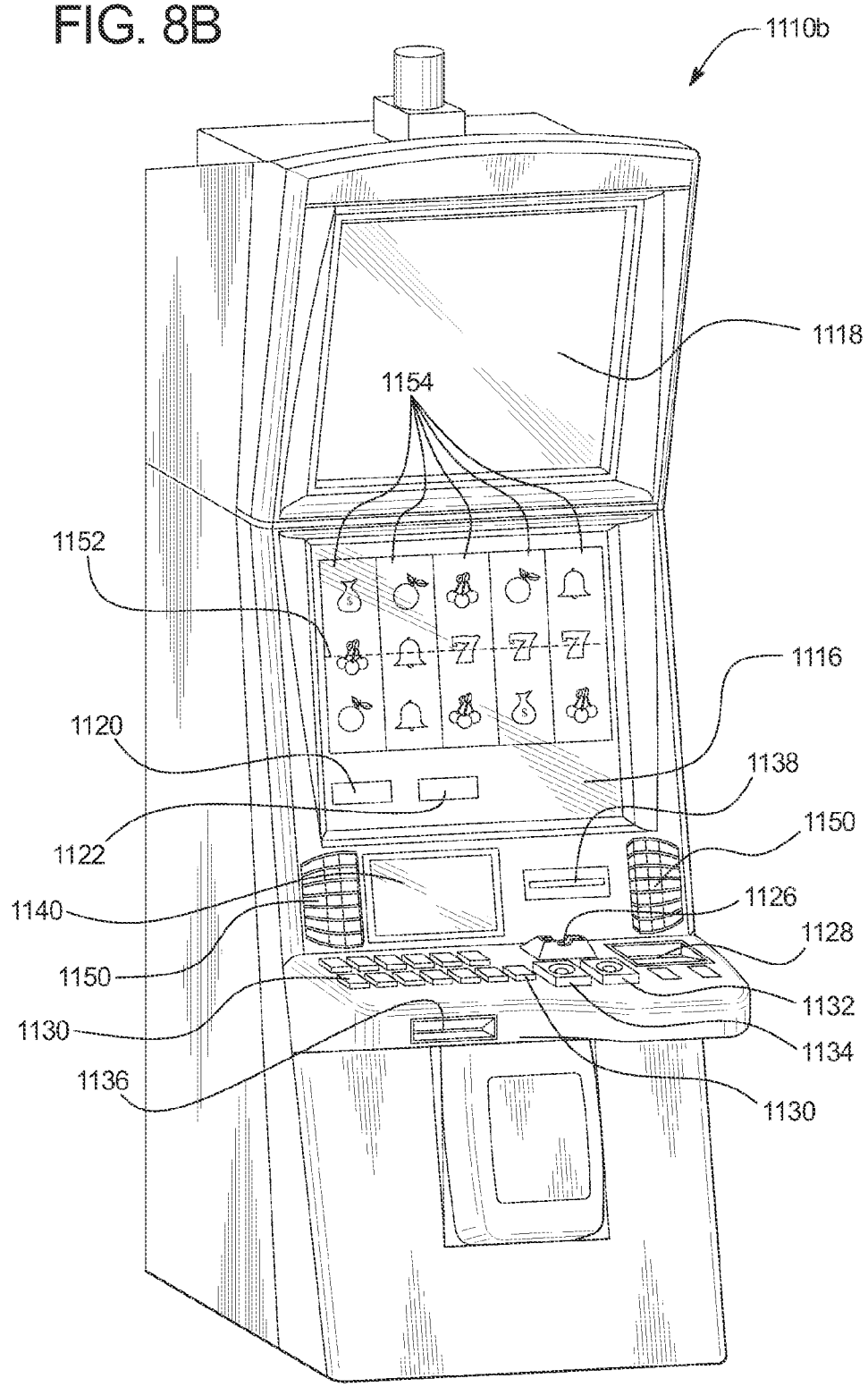

In various embodiments, the EGM includes one or more input devices. The input devices may include any suitable device that enables an input signal to be produced and received by the at least one processor of the EGM. The example EGM illustrated in FIG. 7B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 8A and 8B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 8A and 8B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 8A and 8B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 8A and 8B each include a card reader 1138. The card reader is configured to read a player identification card inserted into the card reader.

In various embodiments, the EGM includes one or more output devices. The example EGM illustrated in FIG. 7B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 8A includes a central display device 1116, a player tracking display 1140, a credit display 1120, and a bet display 1122. The example EGM illustrated in FIG. 8B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 8A and 8B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 8A and 8B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 8A and 8B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 8A and 8B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 8A and 8B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the players surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
   a housing;
   at least one display device supported by the housing;
   a plurality of input devices supported by the housing, said plurality of input devices including:
      (i) an acceptor, and
      (ii) a cashout device;
   at least one processor; and
   at least one memory device which stores a plurality of instructions, which when executed by the at least one processor, cause the at least one processor to operate with the at least one display device and the plurality of input devices to:
      (a) if a physical item is received via the acceptor, establish a credit balance based, at least in part, on a monetary value associated with the received physical item,
      (b) receive at least one wager on at least one of a plurality of games, wherein:
         (i) each of the wagered on games is overlappingly played, and
         (ii) each wager is deducted from the credit balance,
      (c) determine which of the plurality of games are wagered on,
      (d) for each game determined to be wagered on:
         (i) randomly determine a plurality of symbols, and
         (ii) display the randomly determined plurality of symbols at a plurality of symbol display positions associated with said wagered on game,
      (e) for each game determined to not be wagered on:
         (i) not randomly determine any plurality of symbols, and
         (ii) not display any symbols at any symbol display positions associated with said not wagered on game,
      (f) independent of whether each of the plurality of games was wagered on, randomly determine whether to display any wild symbols at any of the symbol display positions of any of the plurality of games,
      (g) for each wagered on game:
         (i) determine any awards associated with the generated symbols and any wild symbols displayed at any of the symbol display positions associated with said wagered on game, and
         (ii) display any determined awards, wherein any determined awards increase the credit balance, and
      (h) if a cashout input is received via the cashout device, cause an initiation of a payout associated with the credit balance.

2. The gaming system of claim 1, wherein when executed by the at least one processor, the plurality of instructions cause the at least one processor to randomly determine whether to display any wild symbols at any of the symbol display positions of any of the plurality of games based on an occurrence of a wild symbol generation event.

3. The gaming system of claim 1, wherein when executed by the at least one processor, the plurality of instructions cause the at least one processor to:
   prior to receiving the wager on each of the plurality of games, display a wild symbol at a first of the symbol display positions, and
   display said wild symbol moving from the first of the symbol display positions to a second of the symbol display positions.

4. The gaming system of claim 1, wherein each of the wagered on games is simultaneously played.

5. The gaming system of claim 1, wherein at least one of: (i) at least one of the wagers and (ii) any determined award include at least one of: (A) an amount of monetary credits, (B) an amount of non-monetary credits, (C) an amount of promotional credits and (D) an amount of player tracking points.

6. A gaming system comprising:
   a housing;
   at least one display device supported by the housing;
   a plurality of input devices supported by the housing, said plurality of input devices including:
      (i) an acceptor, and
      (ii) a cashout device;
   at least one processor; and
   at least one memory device which stores a plurality of instructions, which when executed by the at least one processor, cause the at least one processor to operate with the at least one display device and the plurality of input devices, for a play of a wagered on game, to:
      (a) if a physical item is received via the acceptor, establish a credit balance based, at least in part, on a monetary value associated with the received physical item,
      (b) display a plurality of symbol display positions including a plurality of active symbol display positions and a plurality of inactive symbol display positions,
      (c) randomly determine a plurality of symbols,
      (d) display the randomly determined plurality of symbols at a plurality of the active symbol display positions,
      (e) not display any of the randomly determined plurality of symbols at any of the inactive symbol display positions,
      (f) at any of the active symbol display positions and at any of the inactive symbol display positions, randomly determine whether to display any wild symbols,
      (g) determine any awards associated with the displayed symbols and any wild symbols displayed at the active symbol display positions,
      (h) display any determined awards, wherein any determined awards increase the credit balance, and
      (i) if a cashout input is received via the cashout device, cause an initiation of a payout associated with the credit balance.

7. The gaming system of claim 6, wherein when executed by the at least one processor, the plurality of instructions cause the at least one processor to randomly determine whether to display any wild symbols at any of the active symbol display positions and at any of the inactive symbol display positions based on an occurrence of a wild symbol generation event.

8. The gaming system of claim 6, wherein when executed by the at least one processor, the plurality of instructions cause the at least one processor to:
prior to displaying the randomly determined plurality of symbols, display a wild symbol at a first of the symbol display positions, and
display said wild symbol moving from the first of the symbol display positions to a second of the symbol display positions.

9. The gaming system of claim 6, wherein at least one of: (i) any wager and (ii) any determined award include at least one of: (A) an amount of monetary credits, (B) an amount of non-monetary credits, (C) an amount of promotional credits and (D) an amount of player tracking points.

10. A method of operating a gaming system, said method comprising:
(a) receiving at least one wager on at least one of a plurality of games, wherein each of the wagered on games is overlappingly played,
(b) causing at least one processor to execute a plurality of instructions to determine which of the plurality of games are wagered on,
(c) for each game determined to be wagered on:
(i) causing the at least one processor to execute the plurality of instructions to randomly determine a plurality of symbols, and
(ii) causing at least one display device to display the randomly determined plurality of symbols at a plurality of symbol display positions associated with said wagered on game,
(d) for each game determined to not be wagered on:
(i) not causing the at least one processor to execute the plurality of instructions to randomly determine any plurality of symbols, and
(ii) not causing the at least one display device to display any symbols at any symbol display positions associated with said not wagered on game,
(e) independent of whether each of the plurality of games was wagered on, causing the at least one processor to execute the plurality of instructions to randomly determine whether to display any wild symbols at any of the symbol display positions of any of the plurality of games, and
(f) for each wagered on game:
(i) causing the at least one processor to execute the plurality of instructions to determine any awards associated with the generated symbols and any wild symbols displayed at any of the symbol display positions associated with said wagered on game, and
(ii) causing the at least one display device to display any determined awards, wherein any determined awards cause an increase of a credit balance which is increasable via an acceptor of a physical item associated with a monetary value, and decreasable via a cashout device configured to receive an input to cause an initiation of a payout associated with the credit balance.

11. The method of claim 10, which includes causing the at least one processor to execute the plurality of instructions to randomly determine whether to display any wild symbols at any of the symbol display positions of any of the plurality of games based on an occurrence of a wild symbol generation event.

12. The method of claim 10, which includes:
prior to receiving the wager on each of the plurality of games, causing the at least one display device to display a wild symbol at a first of the symbol display positions, and
causing the at least one display device to display said wild symbol moving from the first of the symbol display positions to a second of the symbol display positions.

13. The method of claim 10, wherein each of the wagered on games is simultaneously played.

14. The method of claim 10, wherein at least one of: (i) at least one of the wagers and (ii) any determined award include at least one of: (A) an amount of monetary credits, (B) an amount of non-monetary credits, (C) an amount of promotional credits and (D) an amount of player tracking points.

15. The method of claim 10, which is provided through a data network.

16. The method of claim 15, wherein the data network is an internet.

17. A method of operating a gaming system, said method comprising:
(a) for a play of a wagered on game, causing at least one display device to display a plurality of symbol display positions including a plurality of active symbol display positions and a plurality of inactive symbol display positions,
(b) causing at least one processor to execute a plurality of instructions to randomly determine a plurality of symbols,
(c) causing the at least one display device to display the randomly determined plurality of symbols at a plurality of the active symbol display positions,
(d) not causing the at least one display device to display any of the randomly determined plurality of symbols at any of the inactive symbol display positions,
(e) at any of the active symbol display positions and at any of the inactive symbol display positions, causing the at least one processor to execute the plurality of instructions to randomly determine whether to display any wild symbols,
(f) causing the at least one processor to execute the plurality of instructions to determine any awards associated with the displayed symbols and any wild symbols displayed at the active symbol display positions, and
(g) causing the at least one display device to display any determined awards, wherein any determined awards cause an increase of a credit balance which is increasable via an acceptor of a physical item associated with a monetary value, and decreasable via a cashout device configured to receive an input to cause an initiation of a payout associated with the credit balance.

18. The method of claim 17, which includes causing the at least one processor to execute the plurality of instructions to randomly determine whether to display any wild symbols at any of the active symbol display positions and at any of the inactive symbol display positions based on an occurrence of a wild symbol generation event.

19. The method of claim 17, which includes:
prior to displaying the randomly determined plurality of symbols, causing the at least one display device to display a wild symbol at a first of the symbol display positions, and causing the at least one display device to display said wild symbol moving from the first of the symbol display positions to a second of the symbol display positions.

20. The method of claim 17, wherein at least one of: (i) any wager and (ii) any determined award include at least one of: (A) an amount of monetary credits, (B) an amount of non-monetary credits, (C) an amount of promotional credits and (D) an amount of player tracking points.

21. The method of claim 17, which is provided through a data network.

22. The method of claim 21, wherein the data network is an internet.

* * * * *